United States Patent
Sun et al.

(10) Patent No.: US 12,438,940 B2
(45) Date of Patent: Oct. 7, 2025

(54) DATA TRANSMISSION METHOD AND SYSTEM, APPARATUS, DEVICE, AND MEDIUM

(71) Applicant: HUAWEI TECHNOLOGIES CO., LTD., Guangdong (CN)

(72) Inventors: Qingchuan Sun, Shenzhen (CN); Jinming Hao, Shenzhen (CN); Hao Pan, Shanghai (CN); Zengshi Huang, Shenzhen (CN); Zhongquan Liu, Shenzhen (CN); Chen Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/147,591

(22) Filed: Dec. 28, 2022

(65) Prior Publication Data
US 2023/0199064 A1  Jun. 22, 2023

Related U.S. Application Data

(63) Continuation of application No. PCT/CN2021/097498, filed on May 31, 2021.

(30) Foreign Application Priority Data

Jun. 30, 2020 (CN) .......................... 202010615499.2

(51) Int. Cl.
H04L 67/1074 (2022.01)
(52) U.S. Cl.
CPC ................................. *H04L 67/1074* (2013.01)
(58) Field of Classification Search
CPC ............ H04L 67/1074; H04L 67/1095; H03M 7/3093
See application file for complete search history.

(56) References Cited

U.S. PATENT DOCUMENTS 8,099,605 B1 * 1/2012 Billsrom ................ H04L 69/40
726/28
9,602,424 B1 * 3/2017 Vincent ............... H04L 67/1008
(Continued)

FOREIGN PATENT DOCUMENTS

CN 102185889 A 9/2011
CN 102323958 A 1/2012
(Continued)

OTHER PUBLICATIONS

International Search Report and Written Opinion in International Appln. No. PCT/CN2021/097498, mailed on Aug. 19, 2021, 15 pages (with English translation).
Shilane et al., "WAN-Optimized Replication of Backup Datasets Using Stream-Informed Delta Compression," ACM Transactions on Storage, vol. 8, No. 4, Dec. 6, 2012, pp. 1-26.
(Continued)

*Primary Examiner* — Chris Parry
*Assistant Examiner* — Abderrahmen Chouat
(74) *Attorney, Agent, or Firm* — Fish & Richardson P.C.

(57) ABSTRACT

The present disclosure relates to data transmission methods, systems, and apparatuses. In one example method, a first device sends first information of a first data block to a second device. The second device searches, based on the first information, a first index for a second data block similar to the first data block, and sends second information of the second data block to the first device. The first device locally obtains, based on the second information, a reference block that is the same as the second data block, compresses a difference part of the first data block relative to the reference block to obtain first compressed information, and sends the first compressed information to the second device. The second device obtains the first data block based on the first compressed information and the second data block.

20 Claims, 13 Drawing Sheets

(56) References Cited

U.S. PATENT DOCUMENTS

| | | | |
|---|---|---|---|
| 10,135,462 B1* | 11/2018 | Wallace | G06F 11/1453 |
| 10,789,003 B1* | 9/2020 | Sun | G06F 3/0673 |
| 11,126,594 B2* | 9/2021 | VanderSpek | G06F 16/1744 |
| 2012/0150826 A1* | 6/2012 | Vijayan Retnamma | G06F 16/174 |
| | | | 707/E17.007 |
| 2013/0066868 A1* | 3/2013 | Hecker | H03M 7/3093 |
| | | | 707/E17.011 |
| 2019/0230184 A1* | 7/2019 | Kameyama | H04L 67/568 |
| 2019/0334727 A1* | 10/2019 | Kaufman | H04L 9/3242 |
| 2019/0379394 A1 | 12/2019 | Hallak et al. | |
| 2020/0117379 A1* | 4/2020 | Pawar | G06F 3/0641 |
| 2021/0004582 A1* | 1/2021 | Evans | G06F 16/9014 |
| 2021/0034349 A1* | 2/2021 | Hatakeyama | H04L 63/0428 |

FOREIGN PATENT DOCUMENTS

| | | | | |
|---|---|---|---|---|
| CN | 102915278 A | | 2/2013 | |
| CN | 105554081 A | | 5/2016 | |
| CN | 106980680 A | | 7/2017 | |
| CN | 107018150 A | | 8/2017 | |
| CN | 108134775 A | * | 6/2018 | ......... H04L 63/0428 |
| CN | 110018990 A | | 7/2019 | |
| WO | WO-2012109145 A2 | * | 8/2012 | ......... G06F 12/0866 |

OTHER PUBLICATIONS

Extended European Search Report in European Appln No. 21832961.3, dated Sep. 5, 2023, 7 pages.

* cited by examiner

DATA TRANSMISSION METHOD AND SYSTEM, APPARATUS, DEVICE, AND MEDIUM

CROSS-REFERENCE TO RELATED APPLICATIONS

This application is a continuation of International Application No. PCT/CN2021/097498, filed on May 31, 2021, which claims priority to Chinese Patent Application No. 202010615499.2 filed on Jun. 30, 2020. The disclosures of the aforementioned applications are hereby incorporated by reference in their entireties.

TECHNICAL FIELD

This application relates to the field of communications technologies, and in particular, to a data transmission method and system, an apparatus, a device, and a medium.

BACKGROUND

Data synchronization technologies are used for remote transmission, to send data from a source end (data sender) to a target end (data receiver) to implement remote data replication or backup. This is an important part of a remote disaster recovery solution. Due to limitation of factors such as costs, for example, in an intercity case, link bandwidth between the source end and the target end is usually low. Therefore, the data synchronization technologies need to resolve a problem of how to effectively use limited link bandwidth to maximize data transmission efficiency.

In the conventional technology, a deduplication technology is mainly used to improve data synchronization transmission efficiency. For example, if a to-be-sent data block is the same as a transmitted data block, a source end transmits only description information of the to-be-sent data block, so that a target end locally obtains the data block based on the description information. In this way, data links are reduced.

However, in an actual working process, a data block repetition rate is low in some database scenarios, and therefore, use of the deduplication technology is limited. As a result, the deduplication technology cannot effectively reduce link data.

Therefore, the foregoing problem in the conventional technology is to be resolved.

SUMMARY

Embodiments of this application provide a data transmission method and system, an apparatus, a device, and a medium, to reduce links for output and transmission between devices.

In view of this, a first aspect of this application provides a data transmission method, including: A first device sends first information of a first data block to a second device, where the first data block is a data block to be sent by the first device to the second device, and the first information is used to describe an attribute of the first data block; the second device searches, based on the first information, a first index for a second data block similar to the first data block, where the first index is used to record information about a data block that has been received by the second device from the first device; the second device sends second information of the second data block to the first device, where the second information is used to describe an attribute of the second data block; the first device locally obtains a reference block based on the second information, where the reference block is the same as the second data block; the first device compresses a difference part of the first data block relative to the reference block, to obtain first compressed information; the first device sends the first compressed information to the second device; and the second device obtains the first data block based on the first compressed information and the second data block.

In this embodiment, before sending the first data block to the second device, the first device sends the first information of the first data block to the second device. The second device searches the first index based on the first information to determine whether a data block similar to the first data block exists in the data block that has been received by the second device from the first device. If the second data block similar to the first data block exists in the second device, the second device sends the second information of the second data block to the first device, so that the first device locally obtains the reference block based on the second information, where the reference block is the same as the second data block. Then, the first device compresses the difference part of the first data block relative to the reference block to obtain the first compressed information, and then sends the first compressed information to the second device, so that the second device locally restores the first data block based on the first compressed information. In this way, a similarity-based deduplication technology is implemented. For a to-be-sent data block, if a transmitted data block is similar to the to-be-sent data block, only a difference part between the two data blocks is transmitted. This effectively reduces data links and improves transmission efficiency of a data synchronization technology.

With reference to the first aspect, in a first possible implementation, the first information includes a first similar fingerprint, and the first similar fingerprint is a weak hash value of the first data block. Optionally, a similar fingerprint (SFP) is used to represent a similarity between data blocks. When similar fingerprints of two data blocks are the same, the two data blocks are similar. A first correspondence between a similar fingerprint of a data block and a second address of the data block in the second device is recorded in the first index, and that the second device obtains, based on the first information, the second data block similar to the first data block includes: The second device searches the first index for a second similar fingerprint that is the same as the first similar fingerprint, where the second similar fingerprint is a similar fingerprint of the second data block; the second device obtains a second address from the first correspondence based on the second similar fingerprint, where the second address is a second address of the second data block in the second device; and the second device obtains the second data block based on the second address.

In this embodiment, optionally, the first information further includes a first address and a first strong fingerprint. The first address is used to record a local storage address of the first data block in the first device, and the first strong fingerprint is used to describe a feature of the first data block. A similar fingerprint (SFP) is used to represent a similarity between data blocks. When similar fingerprints of two data blocks are the same, the two data blocks are similar. Therefore, the second device can search, by using similar fingerprints, the first index for the second data block similar to the first data block.

With reference to the first aspect, in a second possible implementation, the second information further includes a storage address of the reference block in the first device, and that the first device locally obtains a reference block based on the second information includes: The first device locally obtains the reference block based on the storage address of the reference block in the first device.

In this embodiment, the first device obtains the locally stored reference block based on address information sent by the second device, to implement a subsequent differential compression step. Optionally, as a substitute for the address information, the second information may further include mark information, so that the first device can directly obtain the reference block locally based on the mark information. This further reduces data transmission steps.

With reference to the first possible implementation of the first aspect, in a third possible implementation, the first correspondence includes a correspondence between a second address and each of a strong fingerprint and a similar fingerprint. Optionally, the first index in which the first correspondence is located is stored in an external hard disk, the strong fingerprint is a strong hash value of a data block, and the strong hash value is used to describe a data attribute of the corresponding data block. When the second device finds, in the first index, M target similar fingerprints that are the same as the first similar fingerprint, where M is a positive integer greater than 1, the method further includes: The second device obtains M target addresses corresponding to the M target similar fingerprints from the first correspondence based on the M target similar fingerprints; the second device obtains M target data blocks based on the M target addresses; the second device obtains strong fingerprints of the M target data blocks; and the second device obtains one target data block from the M target data blocks as the second data block, where a strong fingerprint of the second data block is consistent with a strong fingerprint recorded in the first index.

In this embodiment, to prevent the obtained second data block from being locally rewritten, the second device obtains the M target data blocks at a time, and then selects, from the M target data blocks as the second data block in a strong fingerprint comparison manner, a data block that is not rewritten. Therefore, efficiency of obtaining the second data block by the second device is improved, and repeated data reading/writing caused by rewriting of a data block is avoided.

With reference to the third possible implementation of the first aspect, in a fourth possible implementation, when the second device obtains, from the M target data blocks, N data blocks similar to the first data block, the second information includes strong fingerprints and mark information of the N candidate data blocks and first addresses of the N candidate data blocks in the first device, where the N candidate data blocks are separately similar to the first data block, the strong fingerprints of the N candidate data blocks are strong hash values of the N candidate data blocks, and N is a positive integer greater than 1. That the first device locally obtains a reference block based on the second information includes: The first device obtains the N candidate data blocks from local storage based on the first addresses of the N candidate data blocks in the first device; the first device obtains the strong fingerprints of the N candidate data blocks; and the first device obtains one target candidate data block from the N candidate data blocks as the reference block, where a strong fingerprint of the target candidate data block is the same as a strong fingerprint recorded in the second information. That the first device sends the first compressed information to the second device includes: The first device sends mark information of the target candidate data block to the second device. That the second device obtains the first data block based on the first compressed information and the candidate data block includes: The second device locally obtains the target candidate block based on the mark information of the target candidate data block; and the second device obtains the first data block based on the first compressed information and the target candidate data block.

In this embodiment, to prevent a candidate block that is the same as the second data block from being rewritten in the first device, the second device obtains, at a time, the N data blocks similar to the first data block from the M target data blocks as the N candidate data blocks, so that the first device selects, as the reference block, a data block that is not locally rewritten. This avoids a similarity-based deduplication failure caused by rewriting of a data block.

With reference to the fourth possible implementation of the first aspect, in a fifth possible implementation, the second information further includes sorting information, and the sorting information is used to sort similarities between the first data block and the N candidate data blocks. That the first device obtains the strong fingerprints of the N candidate data blocks includes: The first device obtains the strong fingerprints of the N candidate data blocks one by one based on the sorting information. When the first device obtains the first target candidate data block whose strong fingerprint is the same as a strong fingerprint recorded in the second information, the first device uses the first target candidate data block as the candidate block.

In this embodiment, after obtaining the N candidate data blocks, the second device further sorts the N candidate data blocks. A sorting principle may be based on a similarity between a candidate data block and the first data block, and a candidate block with a higher similarity is sorted first. Therefore, the first device may determine, one by one based on the sorting information, whether the N candidate data blocks are rewritten, and when obtaining the first target candidate data block whose strong fingerprint is the same as the strong fingerprint recorded in the second information, use the first target candidate data block as the candidate block. In this manner, it is ensured that the first device can determine, as the reference block, a most suitable data block that is not rewritten.

With reference to the fourth possible implementation of the first aspect, in a fifth possible implementation, the second device is configured to synchronize data in the first device, storage addresses of a synchronized data block in the first device and the second device are consistent, and the storage address of the reference block in the first device is the same as the second address of the second data block in the second device. Alternatively, the second device is configured to back up data in the first device, storage addresses of a backed-up data block in the first device and the second device are inconsistent, and before the first device obtains the second information from the second device, the method further includes: The first device sends a third address when sending the second data block to the second device, where the third address is the storage address, in the first device, of the reference block that is the same as the second data block. In this case, a storage address that is of the second data block in the first device and that is included in the second information is the third address.

With reference to the first aspect and the first to the fifth possible implementations of the first aspect, in a sixth possible implementation, the first compressed information includes a first compressed block and difference information, the first compressed block includes the difference part between the first data block and the reference block, the difference information is used to describe a status of a difference between the first data block and the reference block, and that the second device obtains the first data block based on the first compressed information and the second data block includes: The second device obtains the first data block based on the first compressed block, the difference information, and the second data block.

In this embodiment, the first compressed block records information about the difference between the first data block and the reference block. Because the reference block and the second data block are completely the same, all data of the first data block may be obtained by adding data of the first compressed block to data of the second data block. Further, as description information, the difference information records the status of the difference between the first data block and the second data block. Therefore, the second device can locally obtain the first data block based on the first compressed block, the difference information, and the second data block.

A second aspect of this application provides a data transmission method, including: A first device obtains first information of a first data block, where the first data block is a data block to be sent by the first device to a second device, the second device is configured to receive a data block sent by the first device, and the first information is used to describe an attribute of the first data block; the first device searches, based on the first information, a first index for a second data block similar to the first data block, where the first index is used to record information about a data block that has been sent by the first device to the second device; the first device compresses a difference part of the first data block relative to the second data block, to obtain first compressed information; and the first device sends the first compressed information to the second device, so that the second device obtains the first data block based on the first compressed information.

In this embodiment, for the first data block to be sent by the first device, the first device searches the local first index to determine whether the second data block similar to the first data block exists in the data block that has been sent to the second device. If the second data block similar to the first data block exists, the first device compresses the difference part of the first data block relative to the second data block to obtain the first compressed information, and then sends the first compressed information to the second device, so that the second device locally restores the first data block based on the first compressed information. Because the first compressed information includes only the difference part between the first data block and the second data block, an amount of transmitted data is greatly reduced.

With reference to the second aspect, in a first possible implementation, the first information includes a first similar fingerprint, the first similar fingerprint is a weak hash value of the first data block, a first correspondence between a similar fingerprint of a data block and a storage address of the data block in the first device is recorded in the first index, and that the first device searches, based on the first information, a first index for a second data block similar to the first data block includes: The first device searches the first index for a second similar fingerprint that is the same as the first similar fingerprint, where the second similar fingerprint is a weak hash value of the second data block; the first device obtains a second address from the first correspondence based on the second similar fingerprint, where the second address is a storage address of the second data block in the first device; and the first device obtains the second data block based on the second address.

In this embodiment, optionally, the first information further includes a first address and a first strong fingerprint. The first address is used to record a local storage address of the first data block in the first device, and the first strong fingerprint is used to describe a feature of the first data block. A similar fingerprint (SFP) is used to represent a similarity between data blocks. When similar fingerprints of two data blocks are the same, the two data blocks are similar. Therefore, the first device can search, by using similar fingerprints, the first index for the second data block similar to the first data block.

With reference to the first possible implementation of the second aspect, in a second possible implementation, the first correspondence is a correspondence between a storage address and each of a strong fingerprint and a similar fingerprint, the strong fingerprint is a strong hash value of a data block, and the strong hash value is used to describe a data attribute of the corresponding data block. When the first device finds, in the first index, M target similar fingerprints that are the same as the first similar fingerprint, where M is a positive integer greater than 1, the method further includes: The first device obtains M target addresses corresponding to the M target similar fingerprints from the first correspondence based on the M target similar fingerprints; the first device obtains M target data blocks based on the M target addresses; the first device obtains strong fingerprints of the M target data blocks; and the first device obtains one target data block from the M target data blocks as the second data block, where a strong fingerprint of the second data block is consistent with a strong fingerprint recorded in the first index.

In this embodiment, to prevent the obtained second data block from being locally rewritten, the first device obtains the M target data blocks at a time, and then selects, from the M target data blocks as the second data block in a strong fingerprint comparison manner, a data block that is not rewritten. Therefore, efficiency of obtaining the second data block by the first device is improved, and repeated data reading/writing caused by rewriting of a data block is avoided.

With reference to the second possible implementation of the second aspect, in a third possible implementation, when a data attribute of the $(M-1)^{th}$ target data block in the M target data blocks is inconsistent with a data attribute described by a corresponding strong fingerprint, the method further includes: The first device updates, in the first index, an entry sequence of the $(M-1)^{th}$ target data block in the first index and a similar fingerprint and the strong fingerprint that are of the $(M-1)^{th}$ target data block.

In this embodiment, for the M target data blocks obtained by the first device, when verifying, by using a strong fingerprint, that a data block is rewritten, the first device adds information about the rewritten data block to the first index, so that the first index is maintained in a working process. This helps improve accuracy of searching for a similar block subsequently.

With reference to the third possible implementation of the second aspect, in a fourth possible implementation, the second device is configured to synchronize data in the first device, storage addresses of a synchronized data block in the first device and the second device are consistent, and after the first device performs differential compression on the first data block based on the second data block to obtain a first compressed block and difference information, the method further includes: The first device sends the second address of the second data block to the second device, so that the second device locally obtains a reference block based on the second address.

In this embodiment, in a synchronization scenario, the storage addresses of the synchronized data block in the first device and the second device are consistent. In this case, the first device sends the second address of the second data block to the second device, so that the second device can locally obtain, based on the second address, the reference block that is the same as the second data block.

With reference to the third possible implementation of the second aspect, in a fifth possible implementation, the second device is configured to back up data in the first device, and storage addresses of a backed-up data block in the first device and the second device are inconsistent. Before the first device obtains the first information of the first data block, the method further includes: The first device obtains a second feedback message from the second device, where the second feedback message is used to record a third address of storing the second data block in the second device. After the first device performs differential compression on the first data block based on the second data block to obtain a first compressed block and difference information, the method further includes: The first device sends the third address to the second device, so that the second device locally obtains the second data block based on the third address.

In this embodiment, in a backup scenario, the storage addresses of the backed-up data block in the first device and the second device are consistent. In this case, after the first device sends the second data block to the second device, the first device obtains the second feedback message from the second device. The second feedback message is used to record the third address of storing the second data block in the second device. In this way, the first device learns of a storage location, of a reference block that is the same as the second data block, in the second device. When the first device performs differential compression on the first data block based on the second data block, the first device attaches the third address to the first compressed information and sends the first compressed information to the second device, so that the second device can locally obtain, based on the third address, the reference block that is the same as the second data block.

With reference to the fifth possible implementation of the second aspect, in a sixth possible implementation, after the first device sends the third address to the second device, the method further includes: The first device obtains a first feedback message from the second device, where the first feedback message is used to record a fourth address of storing the first data block in the second device; and the first device adds a correspondence between the fourth address and each of a first strong fingerprint and the first similar fingerprint to the first correspondence, where the first strong fingerprint is a strong fingerprint of the first data block.

In this embodiment, in a backup scenario, storage addresses of a same data block in the first device and the second device are inconsistent. Therefore, after locally restoring the first data block, the second device needs to notify the first device of a current storage address of the first data block in the second device by using a feedback message, so that the first device records information about the first data block in the first index. This implements update and maintenance of the first index and improves accuracy of querying the first index in a subsequent working process.

With reference to the second aspect and the first to the sixth possible implementations of the second aspect, in a seventh possible implementation, the first compressed information includes a first compressed block and difference information, the first compressed block includes the difference part between the first data block and the second data block, and the difference information is used to describe a status of a difference between the first data block and the second data block, so that the second device obtains the first data block based on the first compressed block, the difference information, and a reference block, where the reference block is a data block that is in the second device and that is the same as the second data block.

In this embodiment, the first compressed block records information about the difference between the first data block and the second data block. Therefore, all data of the first data block may be obtained by adding data of the first compressed block to data of the second data block. Further, as description information, the difference information records the status of the difference between the first data block and the second data block. Therefore, the second device can locally obtain the first data block based on the first compressed block, the difference information, and the reference block that is the same as the second data block.

A third aspect of this application provides a data transmission method, including: A second device obtains first compressed information from a first device, where the first compressed information is information obtained by the first device by compressing a difference part of a first data block relative to a second data block, the first data block is a data block to be sent by the first device to the second device, and the second data block is a data block that has been sent by the first device to the second device; the second device locally obtains a reference block, where the reference block is the same as the second data block in the first device; and the second device obtains the first data block based on the first compressed information and the reference block.

In this embodiment, the first device performs differential compression on the to-be-sent first data block based on the second data block that has been sent to the second device, to send, to the second device, the first compressed information indicating the difference part between the first data block and the second data block. After obtaining the first compressed information, the second device decompresses the first compressed information based on the local reference block that is the same as the second data block, to locally obtain the first data block. In this working manner, because the first compressed information includes only difference information between the first data block and the second data block, compared with that in a case in which the first data block is transmitted, an amount of transmitted data is greatly reduced, and data transmission efficiency is improved.

With reference to the third aspect, in a first possible implementation, the first compressed information includes a first compressed block and difference information, the first compressed block includes the difference part between the first data block and the second data block, the difference information is used to describe a status of a difference between the first data block and the second data block, and that the second device obtains the first data block based on the first compressed information and the reference block includes: The second device obtains the first data block based on the first compressed block, the difference information, and the reference block.

In this embodiment, the first compressed block records information about the difference between the first data block and the second data block. Therefore, all data of the first data block may be obtained by adding data of the first compressed block to data of the second data block. Further, as description information, the difference information records the status of the difference between the first data block and the second data block. Therefore, the second device can locally obtain the first data block based on the first compressed block, the difference information, and the reference block that is the same as the second data block.

With reference to the third aspect or the first possible implementation of the third aspect, in a second possible implementation, the first compressed information includes a storage address of the reference block in the second device, and that the second device locally obtains a reference block based on the first compressed information includes: The second device locally obtains the reference block based on the storage address of the reference block in the second device.

In this embodiment, the storage address of the reference block in the second device is attached to the first compressed information, so that the second device can locally obtain, based on the address, the reference block that is the same as the second data block.

A fourth aspect of this application provides a data transmission system. The system includes a first device and a second device. The second device is configured to receive data sent by the first device. The first device includes a first sending unit, where the first sending unit is configured to send first information of a first data block to the second device, the first data block is a data block to be sent by the first device to the second device, and the first information is used to describe an attribute of the first data block. The second device includes: a search unit, where the search unit is configured to search, based on the first information sent by the sending unit, a first index for a second data block similar to the first data block, and the first index is used to record information about a data block that has been received by the second device from the first device; and a second sending unit, where the second sending unit is configured to send second information of the second data block found by the search unit to the first device, and the second information is used to describe an attribute of the second data block. The first device further includes: an obtaining unit, where the obtaining unit is configured to locally obtain a reference block based on the second information, and the reference block is the same as the second data block; and a compression unit, where the compression unit is configured to compress a difference part of the first data block relative to the reference block obtained by the obtaining unit, to obtain first compressed information. The first sending unit is further configured to send the first compressed information to the second device. The second device further includes a decompression unit, where the decompression unit is configured to obtain the first data block based on the first compressed information and the second data block.

In this embodiment, before sending the first data block to the second device, the first device sends the first information of the first data block to the second device. The second device searches the first index based on the first information to determine whether a data block similar to the first data block exists in the data block that has been received by the second device from the first device. If the second data block similar to the first data block exists in the second device, the second device sends the second information of the second data block to the first device, so that the first device locally obtains the reference block based on the second information, where the reference block is the same as the second data block. Then, the first device compresses the difference part of the first data block relative to the reference block to obtain the first compressed information, and then sends the first compressed information to the second device, so that the second device locally restores the first data block based on the first compressed information. In this way, a similarity-based deduplication technology is implemented. For a to-be-sent data block, if a transmitted data block is similar to the to-be-sent data block, only a difference part between the two data blocks is transmitted. This effectively reduces data links and improves transmission efficiency of a data synchronization technology.

With reference to the fourth aspect, in a first possible implementation, the first information includes a first similar fingerprint, the first similar fingerprint is a weak hash value of the first data block, a first correspondence between a similar fingerprint of a data block and a second address of the data block in the second device is recorded in the first index, and the search unit is further configured to: search the first index for a second similar fingerprint that is the same as the first similar fingerprint, where the second similar fingerprint is a similar fingerprint of the second data block; obtain a second address from the first correspondence based on the second similar fingerprint, where the second address is a second address of the second data block in the second device; and obtain the second data block based on the second address.

In this embodiment, optionally, the first information further includes a first address and a first strong fingerprint. The first address is used to record a local storage address of the first data block in the first device, and the first strong fingerprint is used to describe a feature of the first data block. A similar fingerprint (SFP) is used to represent a similarity between data blocks. When similar fingerprints of two data blocks are the same, the two data blocks are similar. Therefore, the second device can search, by using similar fingerprints, the first index for the second data block similar to the first data block.

With reference to the fourth aspect, in a second possible implementation, the second information further includes a storage address of the reference block in the first device, and the obtaining unit is further configured to locally obtain the reference block based on the storage address of the reference block in the first device.

In this embodiment, the first device obtains the locally stored reference block based on address information sent by the second device, to implement a subsequent differential compression step. Optionally, as a substitute for the address information, the second information may further include mark information, so that the first device can directly obtain the reference block locally based on the mark information. This further reduces data transmission steps.

With reference to the first possible implementation of the fourth aspect, in a second possible implementation, the first correspondence includes a correspondence between a second address and each of a strong fingerprint and a similar fingerprint, the strong fingerprint is a strong hash value of a data block, and the strong hash value is used to describe a data attribute of the corresponding data block; and when the second device finds, in the first index, M target similar fingerprints that are the same as the first similar fingerprint, where M is a positive integer greater than 1, the second device further includes a screening unit, and the screening unit is configured to: obtain M target addresses corresponding to the M target similar fingerprints from the first correspondence based on the M target similar fingerprints; obtain M target data blocks based on the M target addresses; obtain strong fingerprints of the M target data blocks; and obtain one target data block from the M target data blocks as the second data block, where a strong fingerprint of the second data block is consistent with a strong fingerprint recorded in the first index.

In this embodiment, to prevent the obtained second data block from being locally rewritten, the second device obtains the M target data blocks at a time, and then selects, from the M target data blocks as the second data block in a strong fingerprint comparison manner, a data block that is not rewritten. Therefore, efficiency of obtaining the second data block by the second device is improved, and repeated data reading/writing caused by rewriting of a data block is avoided.

With reference to the second possible implementation of the fourth aspect, in a third possible implementation, when the second device obtains, from the M target data blocks, N data blocks similar to the first data block, the second information includes strong fingerprints and mark information of the N candidate data blocks and first addresses of the N candidate data blocks in the first device, where the N candidate data blocks are separately similar to the first data block, the strong fingerprints of the N candidate data blocks are strong hash values of the N candidate data blocks, and N is a positive integer greater than 1. The obtaining unit is further configured to: obtain the N candidate data blocks from local storage based on the first addresses of the N candidate data blocks in the first device; obtain the strong fingerprints of the N candidate data blocks; and obtain one target candidate data block from the N candidate data blocks as the reference block, where a strong fingerprint of the target candidate data block is the same as a strong fingerprint recorded in the second information. The first sending unit is further configured to send mark information of the target candidate data block to the second device. The decompression unit is further configured to: locally obtain the target candidate block based on the mark information of the target candidate data block; and obtain the first data block based on the first compressed information and the target candidate data block.

In this embodiment, to prevent a candidate block that is the same as the second data block from being rewritten in the first device, the second device obtains, at a time, the N data blocks similar to the first data block from the M target data blocks as the N candidate data blocks, so that the first device selects, as the reference block, a data block that is not locally rewritten. This avoids a similarity-based deduplication failure caused by rewriting of a data block.

With reference to the fourth aspect and the first to the third possible implementations of the fourth aspect, in a fourth possible implementation, the first compressed information includes a first compressed block and difference information, the first compressed block includes the difference part between the first data block and the reference block, the difference information is used to describe a status of a difference between the first data block and the reference block, and the decompression unit is further configured to obtain the first data block based on the first compressed block, the difference information, and the second data block.

In this embodiment, the first compressed block records information about the difference between the first data block and the reference block. Because the reference block and the second data block are completely the same, all data of the first data block may be obtained by adding data of the first compressed block to data of the second data block. Further, as description information, the difference information records the status of the difference between the first data block and the second data block. Therefore, the second device can locally obtain the first data block based on the first compressed block, the difference information, and the second data block.

A fifth aspect of this application provides a data sending device, including: an obtaining unit, where the obtaining unit is configured to obtain first information of a first data block, the first data block is a data block to be sent by the data sending device to a second device, the second device is configured to receive a data block sent by the data sending device, and the first information is used to describe an attribute of the first data block; a search unit, where the search unit is configured to search, based on the first information obtained by the obtaining unit, a first index for a second data block similar to the first data block, and the first index is used to record information about a data block that has been sent by the data sending device to the second device; a compression unit, where the compression unit is configured to compress a difference part of the first data block relative to the second data block found by the search unit, to obtain first compressed information; and a sending unit, where the sending unit is configured to send the first compressed information obtained by the compression unit to the second device, so that the second device obtains the first data block based on the first compressed information.

In this embodiment, for the first data block to be sent by the data sending device, the data sending device searches the local first index to determine whether the second data block similar to the first data block exists in the data block that has been sent to the second device. If the second data block similar to the first data block exists, the data sending device compresses the difference part of the first data block relative to the second data block to obtain the first compressed information, and then sends the first compressed information to the second device, so that the second device locally restores the first data block based on the first compressed information. Because the first compressed information includes only the difference part between the first data block and the second data block, an amount of transmitted data is greatly reduced.

With reference to the fifth aspect, in a first possible implementation, the first information includes a first similar fingerprint, the first similar fingerprint is a weak hash value of the first data block, a first correspondence between a similar fingerprint of a data block and a storage address of the data block in the data sending device is recorded in the first index, and the search unit is further configured to: search the first index for a second similar fingerprint that is the same as the first similar fingerprint, where the second similar fingerprint is a weak hash value of the second data block; and obtain a second address from the first correspondence based on the second similar fingerprint, where the second address is a storage address of the second data block in the data sending device; and obtain the second data block based on the second address.

In this embodiment, optionally, the first information further includes a first address and a first strong fingerprint. The first address is used to record a local storage address of the first data block in the data sending device, and the first strong fingerprint is used to describe a feature of the first data block. A similar fingerprint (SFP) is used to represent a similarity between data blocks. When similar fingerprints of two data blocks are the same, the two data blocks are similar. Therefore, the data sending device can search, by using similar fingerprints, the first index for the second data block similar to the first data block.

With reference to the first possible implementation of the fifth aspect, in a second possible implementation, the first correspondence is a correspondence between a storage address and each of a strong fingerprint and a similar fingerprint, the strong fingerprint is a strong hash value of a data block, and the strong hash value is used to describe a data attribute of the corresponding data block; and when the data sending device finds, in the first index, M target similar fingerprints that are the same as the first similar fingerprint, where M is a positive integer greater than 1, the apparatus further includes a screening unit, and the screening unit is configured to: obtain M target addresses corresponding to the M target similar fingerprints from the first correspondence based on the M target similar fingerprints; obtain M target data blocks based on the M target addresses; obtain strong fingerprints of the M target data blocks; and obtain one target data block from the M target data blocks as the second data block, where a strong fingerprint of the second data block is consistent with a strong fingerprint recorded in the first index.

In this embodiment, to prevent the obtained second data block from being locally rewritten, the data sending device obtains the M target data blocks at a time, and then selects, from the M target data blocks as the second data block in a strong fingerprint comparison manner, a data block that is not rewritten. Therefore, efficiency of obtaining the second data block by the data sending device is improved, and repeated data reading/writing caused by rewriting of a data block is avoided.

With reference to the fifth aspect and the first and the second possible implementations of the fifth aspect, in a third possible implementation, the first compressed information includes a first compressed block and difference information, the first compressed block includes the difference part between the first data block and the second data block, and the difference information is used to describe a status of a difference between the first data block and the second data block, so that the second device obtains the first data block based on the first compressed block, the difference information, and a reference block, where the reference block is a data block that is in the second device and that is the same as the second data block.

In this embodiment, the first compressed block records information about the difference between the first data block and the second data block. Therefore, all data of the first data block may be obtained by adding data of the first compressed block to data of the second data block. Further, as description information, the difference information records the status of the difference between the first data block and the second data block. Therefore, the second device can locally obtain the first data block based on the first compressed block, the difference information, and the reference block that is the same as the second data block.

A sixth aspect of this application provides a data receiving device, including: a receiving unit, where the receiving unit is configured to obtain first compressed information from a first device, the first compressed information is information obtained by the first device by compressing a difference part of a first data block relative to a second data block, the first data block is a data block to be sent by the first device to the data receiving device, and the second data block is a data block that has been sent by the first device to the data receiving device; an obtaining unit, where the obtaining unit is configured to locally obtain a reference block based on the first compressed information, and the reference block is the same as the second data block in the first device; and a decompression unit, where the decompression unit is configured to obtain the first data block based on the first compressed information received by the receiving unit and the reference block obtained by the obtaining unit.

In this embodiment, the first device performs differential compression on the to-be-sent first data block based on the second data block that has been sent to the data receiving device, to send, to the data receiving device, the first compressed information indicating the difference part between the first data block and the second data block. After obtaining the first compressed information, the data receiving device decompresses the first compressed information based on the local reference block that is the same as the second data block, to locally obtain the first data block. In this working manner, because the first compressed information includes only difference information between the first data block and the second data block, compared with that in a case in which the first data block is transmitted, an amount of transmitted data is greatly reduced, and data transmission efficiency is improved.

With reference to the sixth aspect, in a first possible implementation, the first compressed information includes a first compressed block and difference information, the first compressed block includes the difference part between the first data block and the second data block, the difference information is used to describe a status of a difference between the first data block and the second data block, and the decompression unit is further configured to obtain the first data block based on the first compressed block, the difference information, and the reference block.

In this embodiment, the first compressed block records information about the difference between the first data block and the second data block. Therefore, all data of the first data block may be obtained by adding data of the first compressed block to data of the second data block. Further, as description information, the difference information records the status of the difference between the first data block and the second data block. Therefore, the data receiving device can locally obtain the first data block based on the first compressed block, the difference information, and the reference block that is the same as the second data block.

With reference to the sixth aspect or the first possible implementation of the sixth aspect, in a second possible implementation, the first compressed information includes a storage address of the reference block in the data receiving device, and the obtaining unit is further configured to locally obtain the reference block based on the storage address of the reference block in the data receiving device.

In this embodiment, the storage address of the reference block in the data receiving device is attached to the first compressed information, so that the data receiving device can locally obtain, based on the address, the reference block that is the same as the second data block.

A seventh aspect of this application provides an electronic device. The electronic device includes an interaction apparatus, an input/output (I/O) interface, a processor, and a memory. The memory stores program instructions. The interaction apparatus is configured to obtain an operation instruction entered by a user. The processor is configured to execute the program instructions stored in the memory, to perform the method in any one of the first aspect or the possible implementations of the first aspect.

An eighth aspect of this application provides an electronic device. The electronic device includes an interaction apparatus, an input/output (I/O) interface, a processor, and a memory. The memory stores program instructions. The interaction apparatus is configured to obtain an operation instruction entered by a user. The processor is configured to execute the program instructions stored in the memory, to perform the method in any one of the second aspect or the possible implementations of the second aspect.

A ninth aspect of this application provides an electronic device. The electronic device includes an interaction apparatus, an input/output (I/O) interface, a processor, and a memory. The memory stores program instructions. The interaction apparatus is configured to obtain an operation instruction entered by a user. The processor is configured to execute the program instructions stored in the memory, to perform the method in any one of the third aspect or the possible implementations of the third aspect.

A tenth aspect of this application provides a computer-readable storage medium, including instructions. When the instructions are run on a computer device, the computer device is enabled to perform the method in any one of the first aspect or the possible implementations of the first aspect.

An eleventh aspect of this application provides a computer-readable storage medium, including instructions. When the instructions are run on a computer device, the computer device is enabled to perform the method in any one of the second aspect or the possible implementations of the second aspect.

A twelfth aspect of this application provides a computer-readable storage medium, including instructions. When the instructions are run on a computer device, the computer device is enabled to perform the method in any one of the third aspect or the possible implementations of the third aspect.

According to the foregoing technical solutions, it can be learned that embodiments of this application have the following advantages.

A data transmission method provided in the embodiments includes: A first device sends first information of a first data block to a second device, where the first data block is a data block to be sent by the first device to the second device, and the first information is used to describe an attribute of the first data block; the second device searches, based on the first information, a first index for a second data block similar to the first data block, where the first index is used to record information about a data block that has been received by the second device from the first device; the second device sends second information of the second data block to the first device, where the second information is used to describe an attribute of the second data block; the first device locally obtains a reference block based on the second information, where the reference block is the same as the second data block; the first device compresses a difference part of the first data block relative to the reference block, to obtain first compressed information; the first device sends the first compressed information to the second device; and the second device obtains the first data block based on the first compressed information and the second data block. In this way, a similarity-based deduplication technology is implemented. For a to-be-sent data block, if a transmitted data block is similar to the to-be-sent data block, only a difference part between the two data blocks is transmitted. This effectively reduces data links and improves transmission efficiency of a data synchronization technology.

A data transmission method provided in the embodiments includes: A first device obtains first information of a first data block, where the first data block is a data block to be sent by the first device to a second device, the second device is configured to receive a data block sent by the first device, and the first information is used to describe an attribute of the first data block; the first device searches, based on the first information, a first index for a second data block similar to the first data block, where the first index is used to record information about a data block that has been sent by the first device to the second device; the first device compresses a difference part of the first data block relative to the second data block, to obtain first compressed information; and the first device sends the first compressed information to the second device, so that the second device obtains the first data block based on the first compressed information. For the first data block to be sent by the first device, the first device searches the local first index to determine whether the second data block similar to the first data block exists in the data block that has been sent to the second device. If the second data block similar to the first data block exists, the first device compresses the difference part of the first data block relative to the second data block to obtain the first compressed information, and then sends the first compressed information to the second device, so that the second device locally restores the first data block based on the first compressed information. Because the first compressed information includes only the difference part between the first data block and the second data block, an amount of transmitted data is greatly reduced.

A data transmission method provided in the embodiments includes: A second device obtains first compressed information from a first device, where the first compressed information is information obtained by the first device by compressing a difference part of a first data block relative to a second data block, the first data block is a data block to be sent by the first device to the second device, and the second data block is a data block that has been sent by the first device to the second device; the second device locally obtains a reference block, where the reference block is the same as the second data block in the first device; and the second device obtains the first data block based on the first compressed information and the reference block. In this working manner, because the first compressed information includes only difference information between the first data block and the second data block, compared with that in a case in which the first data block is transmitted, an amount of transmitted data is greatly reduced, and data transmission efficiency is improved.

DESCRIPTION OF EMBODIMENTS

Embodiments of the present disclosure provide a data transmission method and system, an apparatus, a device, and a medium, to resolve a link compression problem in a data transmission process by using a similarity deduplication technology.

To make persons skilled in the art understand the solutions in this application better, the following clearly describes the technical solutions in embodiments of this application with reference to the accompanying drawings in embodiments of this application. It is clear that the described embodiments are merely some but not all of embodiments of this application. All other embodiments obtained by persons of ordinary skill in the art based on embodiments of this application without creative efforts shall fall within the protection scope of this application.

In the specification, claims, and accompanying drawings of this application, the terms "first", "second", "third", "fourth", and so on (if existent) are intended to distinguish between similar objects but do not necessarily indicate a specific order or sequence. It should be understood that the data used in such a way is interchangeable in appropriate circumstances, so that the embodiments described herein can be implemented in other orders than the order illustrated or described herein. In addition, the terms "include", "have", and any variants thereof are intended to cover the non-exclusive inclusion, for example, a process, method, system, product, or device that includes a list of steps or units is not necessarily limited to those expressly listed steps or units, but may include other steps or units not expressly listed or inherent to such a process, method, product, or device.

Figure 1:
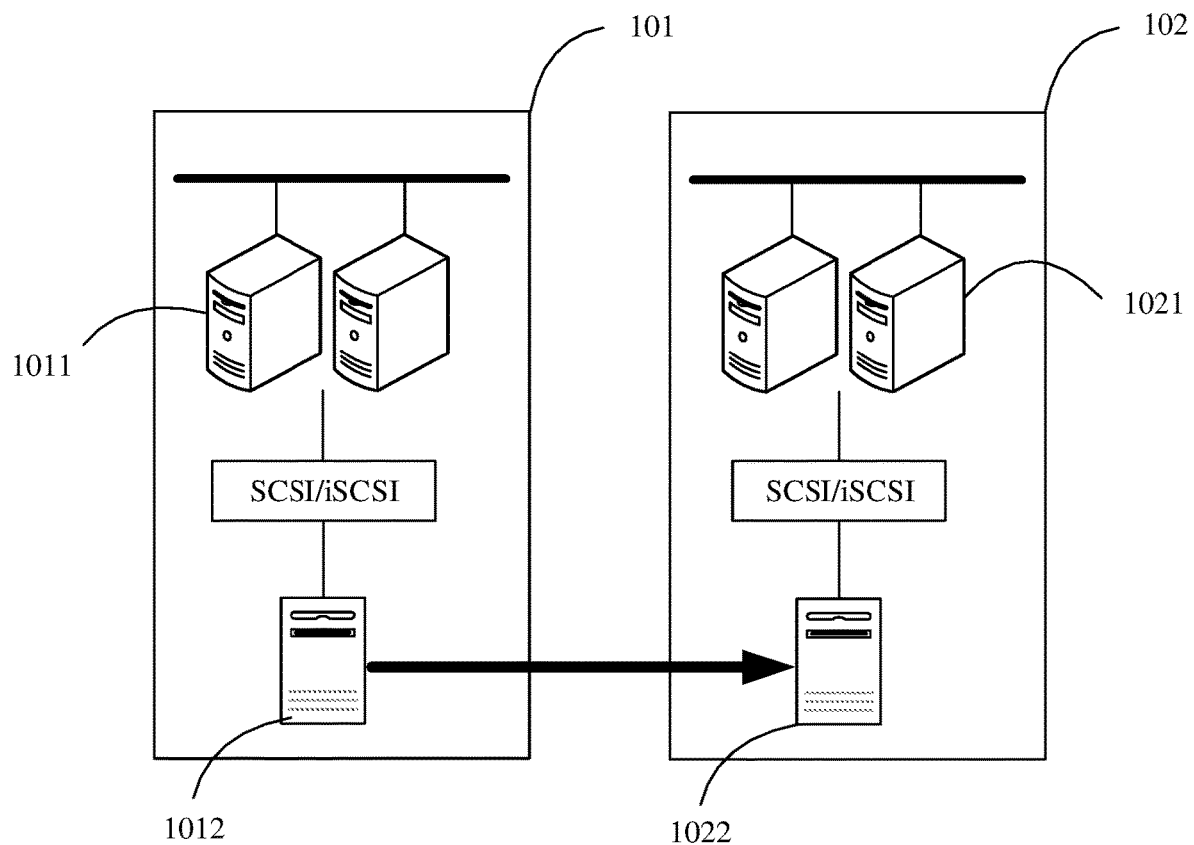
FIG. 1 is a diagram of a system architecture of an application scenario of a data transmission method according to an embodiment of this application.

Data synchronization technologies are used for remote transmission, to send data from a source end (data sender) to a target end (data receiver) to implement remote replication or backup in data scheduling. This is an important part of a remote disaster recovery solution. For example, a system architecture of an application scenario in embodiments of this application may be shown in FIG. 1. In FIG. 1, a production center 101 is a source end and is configured to generate data, and a disaster recovery center 102 is a target end and is configured to back up the data generated by the production center 101. A production host 1011 in the production center 101 is connected to a production storage device 1012 through a small computer system interface (SCSI) or an internet small computer system interface (iSCSI). A disaster recovery host 1021 in the disaster recovery center 102 is connected to a disaster recovery storage device 1022 through a SCSI or an iSCSI. The production storage device 1012 sends a data block to the disaster recovery storage device 1022, so that the disaster recovery center 102 backs up data from the production center 101.

Further, in addition to the backup scenario, the source end and the target end may be further used for data replication. This is not limited in embodiments of this application.

Optionally, the source end and the target end each may be any hardware device having a storage function, for example, a data node, a disk, a server, or a mobile intelligent terminal having a data storage function. This is not limited in embodiments of this application.

In an actual working process, due to limitation of factors such as costs, for example, in an intercity case, link bandwidth between the source end and the target end is usually low. Therefore, the data synchronization technologies need to resolve a problem of how to effectively use limited link bandwidth to maximize data transmission efficiency.

Currently, a deduplication technology is mainly used to improve data synchronization transmission efficiency. For example, if a to-be-sent data block A is the same as a transmitted data block B, a source end transmits only description information of the to-be-sent data block A, so that a target end locally obtains the data block B based on the description information of the data block A. Because the data block A is the same as the data block B, the target end obtains the data block that needs to be sent by the source end. In this way, data links are reduced.

However, in an actual working process, a data block repetition rate is low in some database scenarios. In addition, a small modification to data causes a small change to data in a block. Therefore, a difference from an original block is generated. As a result, the deduplication technology cannot effectively reduce data links.

To resolve the foregoing problem, embodiments of this application provide a data transmission method. According to a similarity-based deduplication technology, a data block similar to a to-be-sent data block is searched for, and differential compression is performed on the to-be-sent data block based on the similar data block. Therefore, data links are efficiently reduced, and solution adaptability is enhanced. For ease of understanding, the following describes in detail the method in embodiments of this application with reference to the accompanying drawings.

It should be noted that, in the data transmission method provided in embodiments of this application, information about a data block that has been sent by a source end to a target end is recorded in an index. In a subsequent working process, when the source end needs to send a data block to the target end, the index is searched to determine whether the current to-be-sent data block is similar to a sent data block. If there is a sent data block similar to the current to-be-sent data block, a subsequent step of similarity-based deduplication is performed. The index may be stored in the target end, and the target end searches for the similar block. Alternatively, the index may be stored in the source end, and the source end searches for the similar block. These two cases are separately described in embodiments of this application.

1. An index is stored in a target end, and the target end searches for a similar block.

Figure 2:
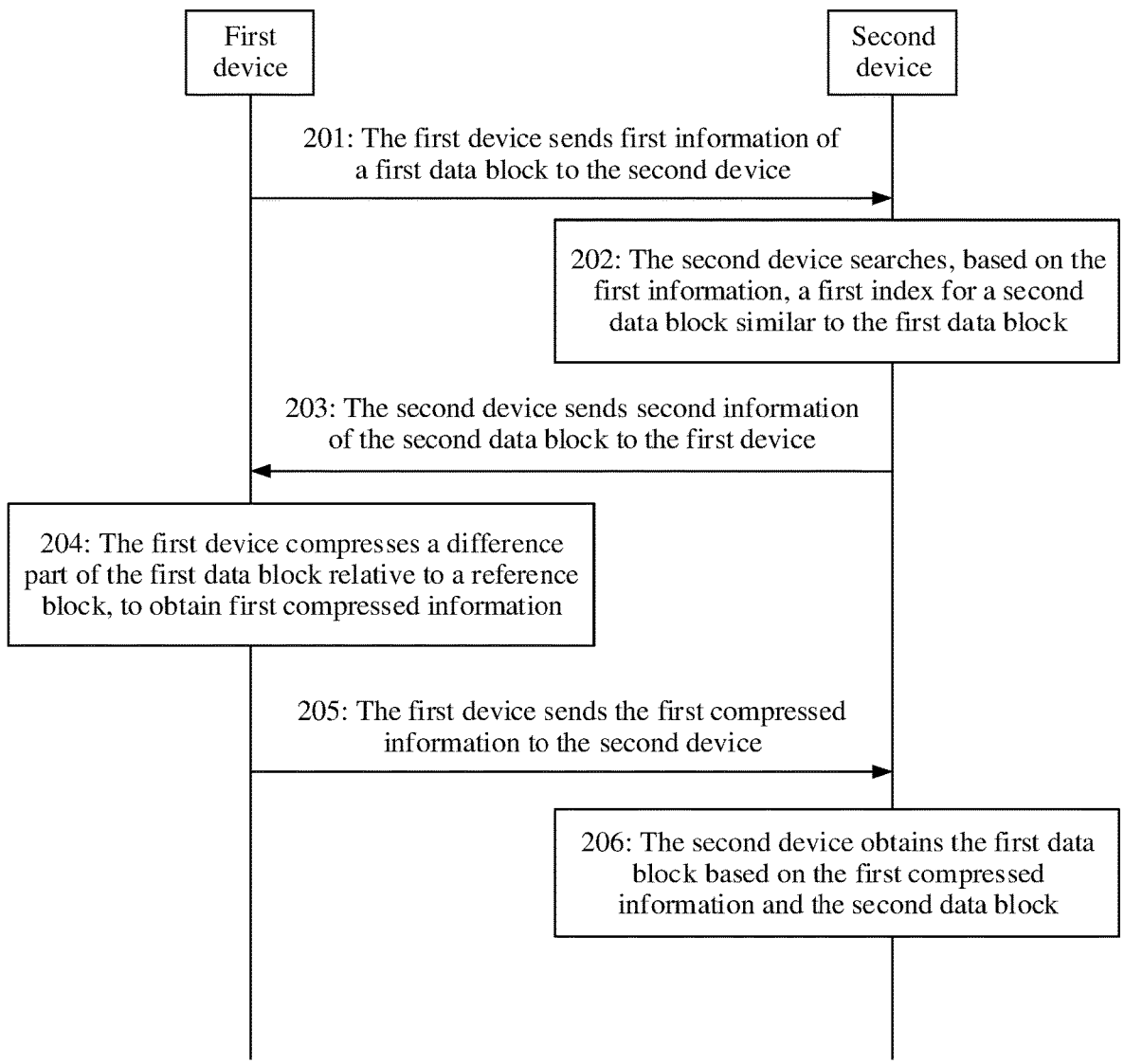
FIG. 2 is a schematic diagram of an implementation of a data transmission method according to an embodiment of this application.

As shown in FIG. 2, Embodiment 1 of a data transmission method provided in an embodiment of this application includes the following steps.

201: A first device sends first information of a first data block to a second device.

In this embodiment, the first device is a source end, the second device is a target end, the first data block is a to-be-sent data block, the second device is configured to receive a data block sent by the first device, and the first information is used to describe an attribute of the first data block.

Further, the first information may include a first address, a first strong fingerprint, and a first similar fingerprint that are of the first data block, the first address is a storage address of the first data block in the first device, the first strong fingerprint is a strong hash value of the first data block, and the first similar fingerprint is a weak hash value of the first data block. A strong fingerprint (FP) is used to describe an attribute of a data block, and whether the data block is rewritten may be determined through comparison on the strong fingerprint of the data block. A similar fingerprint (SFP) is used to determine a similarity between data blocks through comparison. When similar fingerprints of two data blocks are the same, it may be determined that the two data blocks are similar.

202: The second device searches, based on the first information, a first index for a second data block similar to the first data block.

In this embodiment, the first index is used to record information about a data block that has been received by the second device from the first device. Each time the second device obtains a new data block from the first device, the first index is updated. Optionally, a first correspondence between a storage address of a data block in the second device and a similar fingerprint and a strong fingerprint that are of the data block is recorded in the first index. A process of searching for the second data block may specifically include the following steps.

1. The second device searches the first index for a second similar fingerprint that is the same as the first similar fingerprint.

In this embodiment, the second similar fingerprint is a weak hash value of the second data block. When two data blocks are similar (that is, partially the same), there is a high probability that similar fingerprints are the same. Therefore, if the second similar fingerprint that is the same as the first similar fingerprint is found in the first index, it may be determined that the second data block corresponding to the second similar fingerprint and the first data block are similar blocks.

2. The second device obtains a second address from the first correspondence based on the second similar fingerprint.

In this embodiment, the second address is a storage address of the second data block in the second device. Because the first correspondence between a similar fingerprint and a storage address is recorded in the first index, the second device can find the storage address of the second data block in the second device from the first index based on the second similar fingerprint.

3. The second device obtains the second data block based on the second address.

In this embodiment, the second device obtains the second data block, so that a similar block is obtained. The second data block is a data block that is similar to the current to-be-sent first data block and that is in the data block that has been received by the second device.

203: The second device sends second information of the second data block to the first device.

In this embodiment, the second information is used to describe an attribute of the second data block. For example, the second information includes a second strong fingerprint and a second similar fingerprint that are of the second data block. The second strong fingerprint is description information of the second data block.

Optionally, the second information further includes a storage address of a reference block in the first device. The reference block is a data block that is stored in the first device and that is the same as the second data block. In a specific working process, after sending the second data block to the second device, the first device locally stores data of the second data block. To distinguish from the second data block stored in the second device, the second data block stored in the first device is denoted as the reference block. The method provided in this embodiment of this application can be applied to two scenarios: inter-device data synchronization and data backup. In a data synchronization scenario, storage addresses of a synchronized data block in the first device and the second device are consistent. In a data backup scenario, storage addresses of a backed-up data block in the first device and the second device are inconsistent. Therefore, for the two different cases, the following two different methods need to be provided, so that the second information includes the storage address of the reference block in the first device.

1. Data Synchronization Scenario

In the data synchronization scenario, the second address may be directly recorded in the second information. The second address is the storage address of the second data block in the second device. Because storage addresses of a synchronized data block in the first device and the second device are consistent in the data synchronization scenario, the second address is also the storage address of the reference block in the first device. In this case, the second information directly carries the second address as the storage address of the reference block in the first device. Therefore, the first device may locally obtain, directly based on the second address, the reference block that is the same as the second data block.

2. Data Backup Scenario

In the data backup scenario, storage addresses of a backed-up data block in the first device and the second device are inconsistent. In this case, in the foregoing step, when the first device sends a data block to the second device, a storage address of the data block in the first device is attached. For example, when the first device sends the second data block to the second device, a third address is attached and sent. The third address is the storage address of the reference block in the first device, and the reference block and the second data block are a same data block. A data block that has been sent to the second device is denoted as the second data block, and a data block locally stored in the first device is denoted as the reference block. In this way, the second device knows the storage address of the reference block in the first device. In this case, the second information carries the third address as the storage address of the reference block in the first device. In the data backup scenario, the second device records the third address in the first index. In this scenario, the first correspondence includes a correspondence between (a strong fingerprint+a similar fingerprint) and (a local storage address+a storage address in the first device) that are of a data block. The second device adds the third address to the first correspondence. In this way, the second device knows a storage address of each received data block in the first device.

In the data backup scenario, in step 203, the second information sent by the second device to the first device includes the third address.

204: The first device compresses a difference part of the first data block relative to the reference block, to obtain first compressed information.

In this embodiment, the first compressed information is used to record difference data between the first data block and the reference block. Optionally, the first compressed information includes a first compressed block and difference information. The first compressed block includes a difference part between the first data block and the second data block, and the difference information is used to describe a status of a difference between the first data block and the second data block. Optionally, this step may be specifically implemented by using the following steps.

1. The first device obtains the locally stored reference block.

In this embodiment, as described above, the second information includes the storage address of the reference block in the first device, and the first device may locally obtain the reference block based on the address. In the data synchronization scenario, the first device obtains the reference block based on the second address. In the data backup scenario, the first device obtains the reference block based on the third address.

2. The first device compares the first data block with the second data block to obtain the difference information.

In this embodiment, a status of a difference between the first data block and the reference block may be that former parts of data are partially the same, may be that latter parts of data are partially the same, may be that former parts of data are partially the same and latter parts of data are partially the same, or may be that parts of data in the two data blocks are alternately the same. The first device obtains the difference status and records the difference status in the difference information.

3. The first device performs differential compression on the first data block based on the difference information to obtain the first compressed block.

In this embodiment, based on the difference information, the first device deletes a part that is in the first data block and that is repeated with the reference block, so that similarity-based deduplication of the first data block is implemented. The obtained first compressed block records only the difference part between the first data block and the reference block. In addition, how the difference part is specifically different from the reference block is recorded in the difference information. It should be noted that a differential compression technology is a well-known technology, and a person skilled in the art may select different differential compression methods based on actual requirements to perform differential compression on the first data block based on the reference block. This is not limited in this embodiment of this application.

205: The first device sends the first compressed information to the second device.

In this embodiment, the first compressed information may include the first compressed block and the difference information. The first compressed block includes only a part of content in the first data block, and is compressed. The difference information is also description data in a relatively small format. Therefore, compared with transmission of the first data block, an amount of transmitted data is greatly reduced. In a transmission scenario with relatively low bandwidth, an amount of transmitted data can be greatly reduced, and transmission links can be reduced.

206: The second device obtains the first data block based on the first compressed information and the second data block.

In this embodiment, after obtaining the first compressed information, the second device processes the first compressed information. For example, the first compressed information includes the first compressed block and the difference information, the first compressed block is first decompressed to obtain first difference data between the first data block and the second data block, and then the first difference data and the second data block are combined into the first data block based on the difference information. For example, based on the record in the difference information, a size of the first data block is 100 bytes, first 30-byte data in the first data block is different from that in the reference block, and last 70-byte data in the first data block is the same as that in the reference block. Because the reference block and the second data block are a same data block, in this case, the second device may replace, based on the difference information, first 30-byte data in the second data block with data recorded by using the first difference data, to obtain the first data block.

In this embodiment of this application, the first device sends the first information of the first data block to the second device, where the first data block is a data block to be sent by the first device to the second device, and the first information is used to describe the attribute of the first data block; the second device searches, based on the first information, the first index for the second data block similar to the first data block, where the first index is used to record information about a data block that has been received by the second device from the first device; the second device sends the second information of the second data block to the first device, where the second information is used to describe the attribute of the second data block; the first device locally obtains the reference block based on the second information, where the reference block is the same as the second data block; the first device compresses the difference part of the first data block relative to the reference block, to obtain the first compressed information; the first device sends the first compressed information to the second device; and the second device obtains the first data block based on the first compressed information and the second data block. In this way, a similarity-based deduplication technology is implemented. For a to-be-sent data block, if a transmitted data block is similar to the to-be-sent data block, only a difference part between the two data blocks is transmitted. This effectively reduces data links and improves transmission efficiency of a data synchronization technology.

It should be noted that, in the foregoing working process, the first index is used to record information about a data block that has been transmitted to the second device, and specifically includes a correspondence between a storage address (logical block address, LBA) and each of a strong fingerprint (FP) and a similar fingerprint (SFP) that are of the data block. The strong fingerprint may be implemented by using a secure hash algorithm 1 (SHA1), and the correspondence may be abbreviated as (SFP+SHA1)→LBA. Because a large amount of data is transmitted between the first device and the second device, the first index occupies relatively large memory space. In a specific working process, the first index may be stored in an external storage device. For example, the second device is connected to a hard disk through an external interface, a KV database is constructed in the hard disk by using a LevelDB technology, and the KV database implements a function of the first index. When the second device needs to search the first index, the second device may access the KV database in the external hard disk through the external interface, to implement the search.

Correspondingly, based on the implementation of the first index, the data transmission method provided in this embodiment of this application is implemented by using the following steps. For ease of understanding, the following provides detailed descriptions with reference to the accompanying drawings in this specification.

Figure 3:
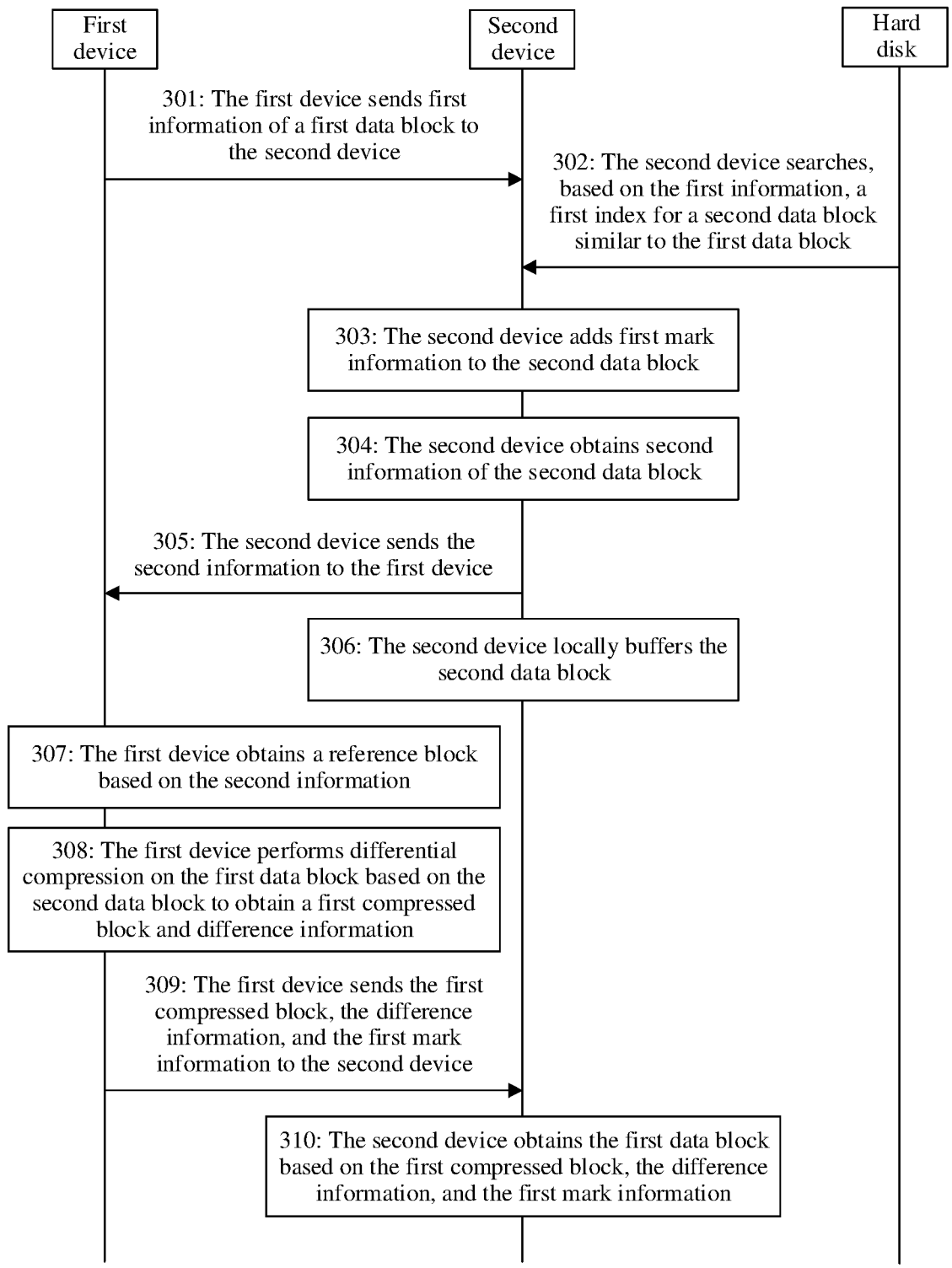
FIG. 3 is a schematic diagram of another implementation of a data transmission method according to an embodiment of this application.

As shown in FIG. 3, Embodiment 2 of a data transmission method provided in this application includes the following steps.

301: A first device sends first information of a first data block to a second device.

In this embodiment, for this step, refer to the foregoing step 201. Details are not described herein again.

302: The second device searches, based on the first information, a first index for a second data block similar to the first data block.

In this embodiment, for this step, refer to the foregoing step 202. Based on step 202, in this embodiment, the first index is stored in an external storage device, for example, a hard disk connected to the second device through an external interface. The second device reads, through the external interface, the first index running on the hard disk, to search for a second similar fingerprint.

It should be noted that, during specific operation, after obtaining a data block sent by the first device, the second device may rewrite the data block, and such rewriting may not be updated in a timely manner in the first index. For example, the first device sends a data block A to the second device. In this case, the second device records information about the data block A in the first index, and the information includes a similar fingerprint A and a storage address A. In a working process of the second device, the data block A is rewritten into a data block A'. In this case, the second device does not update information about the data block A' in the first index. Subsequently, the first device sends a similar fingerprint B, and the similar fingerprint B is a similar fingerprint of a to-be-sent data block B. The second device finds, in the first index based on the similar fingerprint B, that the similar fingerprint A is the same as the similar fingerprint B. This indicates that the data block A and the data block B are similar data blocks. However, in this case, because the data block A has been rewritten, a data block obtained by the second device based on a storage address is no longer the data block A, but the rewritten data block A'. In this case, the data block A' is no longer a similar data block of the data block B. Therefore, after finding the similar data block in the first index, the second device needs to perform a corresponding verification step, to determine whether the obtained data block is rewritten.

Further, because the first index is stored in the external storage device, each time of reading needs to use an external data interface. To improve query efficiency and avoid repeated reading, the second device may query information about a plurality of data blocks similar to the first data block at a time, and then verify the data blocks one by one to select a data block that is not rewritten.

As described above, the step in which the second device searches, based on the first information, the first index for the second data block similar to the first data block may be specifically implemented by using the following steps.

1. The second device finds, in the first index, M target similar fingerprints that are the same as a first similar fingerprint.

In this embodiment, M is a positive integer greater than 1, and the second device finds, in the first index at a time, a plurality of target similar fingerprints that are the same as the first similar fingerprint for verification and screening in a subsequent step, to prevent the second device from repeatedly reading the external hard disk. It may be understood that, that M is a positive integer greater than 1 is an ideal operation situation. During actual operation, if only one similar fingerprint that is the same as the first similar fingerprint is found, M may be equal to 1. This is not limited in this embodiment of this application.

2. The second device obtains M target addresses corresponding to the M target similar fingerprints from a first correspondence based on the M target similar fingerprints.

In this embodiment, the first correspondence is a first correspondence recorded in the first index, and the first correspondence records a correspondence between (a strong fingerprint+a similar fingerprint) and a storage address. The second device may obtain, from the first correspondence based on the M target similar fingerprints, target addresses of M target data blocks corresponding to the M target similar fingerprints in the second device.

3. The second device obtains the M target data blocks one by one based on the M target addresses.

In this embodiment, data blocks are locally stored in the second device, and the second device may obtain the M target data blocks based on the M target addresses.

4. The second device determines, one by one according to a preset rule, whether the M target data blocks are rewritten.

In this embodiment, the preset rule is specifically: determining whether a strong fingerprint of a target data block is the same as a strong fingerprint recorded in the first index, where if the strong fingerprints are different, it indicates that the data block is rewritten; or if the strong fingerprints are the same, it indicates that the data block is not rewritten. Because the strong fingerprint is used to record a data attribute of the data block, whether the data block is rewritten may be determined based on whether the strong fingerprint is changed.

In a specific working process, the first index records a correspondence between (a strong fingerprint+a similar fingerprint) and a storage address. The second device may obtain, based on the M target similar fingerprints, M target strong fingerprints corresponding to the M target similar fingerprints. The strong fingerprint may be implemented by using SHA1, and the strong fingerprint is used to record a data attribute of a data block. Therefore, the second device may determine, by using the strong fingerprint, whether the obtained target data block is rewritten.

In the foregoing manner, the second device determines, one by one, whether the M target data blocks are rewritten. If the $(M-1)^{th}$ data block in the M target data blocks is rewritten, the $(M-1)^{th}$ data block is discarded and the $M^{th}$ data block is obtained. After a data block that is not rewritten is obtained, the data block is determined as the second data block similar to the first data block.

Further, according to the foregoing step, the second device knows which data blocks in the M target data blocks are rewritten. In this case, the second device needs to update information about the rewritten data blocks in the first index, to improve accuracy of the first index.

Specifically, in the foregoing step, if the second device determines that the $(M-1)^{th}$ data block has been rewritten, the second device updates, in the first index, an entry sequence of the $(M-1)^{th}$ target data block in the first index, a similar fingerprint of the $(M-1)^{th}$ target data block, and a strong fingerprint of the $(M-1)^{th}$ target data block.

303: The second device adds first mark information to the second data block.

In this embodiment, the first mark information is used to mark the second data block, and the first mark information uniquely marks the second data block in a subsequent step.

304: The second device obtains second information of the second data block.

In this embodiment, the second device obtains a second strong fingerprint and a second similar fingerprint that are of the second data block and a storage address of the second data block in the first device as the second information. Further, the second information further includes the first mark information.

It should be noted that the method provided in this embodiment of this application can be applied to two scenarios: inter-device data synchronization and data backup. In a data synchronization scenario, storage addresses of a synchronized data block in the first device and the second device are consistent. In a data backup scenario, storage addresses of a backed-up data block in the first device and the second device are inconsistent. Therefore, for the two different cases, two different methods need to be provided, so that the second information includes the storage address of the second data block in the first device. For a specific implementation, refer to the description in step 203. Details are not described herein again.

305: The second device sends the second information to the first device.

In this embodiment, the second information includes the second strong fingerprint and the second similar fingerprint that are of the second data block and a storage address of a reference block in the first device, and further includes the first mark information of the second data block. The first mark information is used to mark the second data block.

306: The second device locally buffers the second data block.

In this embodiment, the second device buffers the second data block in a local buffer, to perform a restoration operation on the first data block in a subsequent step. Optionally, the second data block may be buffered in the local buffer.

307: The first device obtains the reference block based on the second information.

In this embodiment, the first device obtains the locally stored reference block based on the storage address that is of the reference block in the first device and that is recorded in the second information. Because the reference block and the second data block stored in the second device are a same data block, the first device locally obtains a data block that is the same as the second data block.

308: The first device performs differential compression on the first data block based on the reference block to obtain a first compressed block and difference information.

In this embodiment, the first compressed block includes a difference part between the first data block and the second data block, and the difference information is used to describe a status of a difference between the first data block and the second data block. For a specific implementation, refer to the description in step 204. Details are not described herein again.

309: The first device sends the first compressed block, the difference information, and the first mark information to the second device.

In this embodiment, the first mark information is used to notify the second device that the first compressed block and the difference information are obtained based on the second data block marked by the first mark information.

310: The second device obtains the first data block based on the first compressed block, the difference information, and the first mark information.

In this embodiment, a specific implementation of obtaining the first data block may be implemented by using the following steps.

1. The second device obtains the second data block from the local buffer based on the first mark information.

In this embodiment, the first mark information may be mark information having only several bytes. Compared with the manner of obtaining the second data block by sending the storage address in Embodiment 1, the manner of obtaining the second data block by sending the first mark information can further reduce a transmission amount on a data link.

2. The second device locally restores the first data block based on the second data block, the first compressed block, and the difference information.

In this embodiment, for a specific working manner, refer to the foregoing step 206. Details are not described herein again.

In this embodiment, when querying, in the first index, a similar fingerprint that is the same as the first similar fingerprint, the second device obtains a plurality of target similar fingerprints at a time, then obtains corresponding target similar blocks based on the target similar fingerprints, and selects, from the plurality of target similar blocks as the second data block, a data block that is not rewritten, to prevent a case in which similarity-based deduplication fails because a data block is rewritten in the second device.

It should be noted that, a problem that a data block is rewritten may also occur in the first device. Therefore, the second device may query, based on the first information according to the method in Embodiment 2, a plurality of data blocks similar to the first data block, and send the plurality of data blocks to the first device as candidate data blocks, so that the first device selects, from the plurality of candidate data blocks, a data block that is not locally rewritten, to perform differential compression on the first data block. For ease of understanding, the following describes this case in detail.

Figure 4:
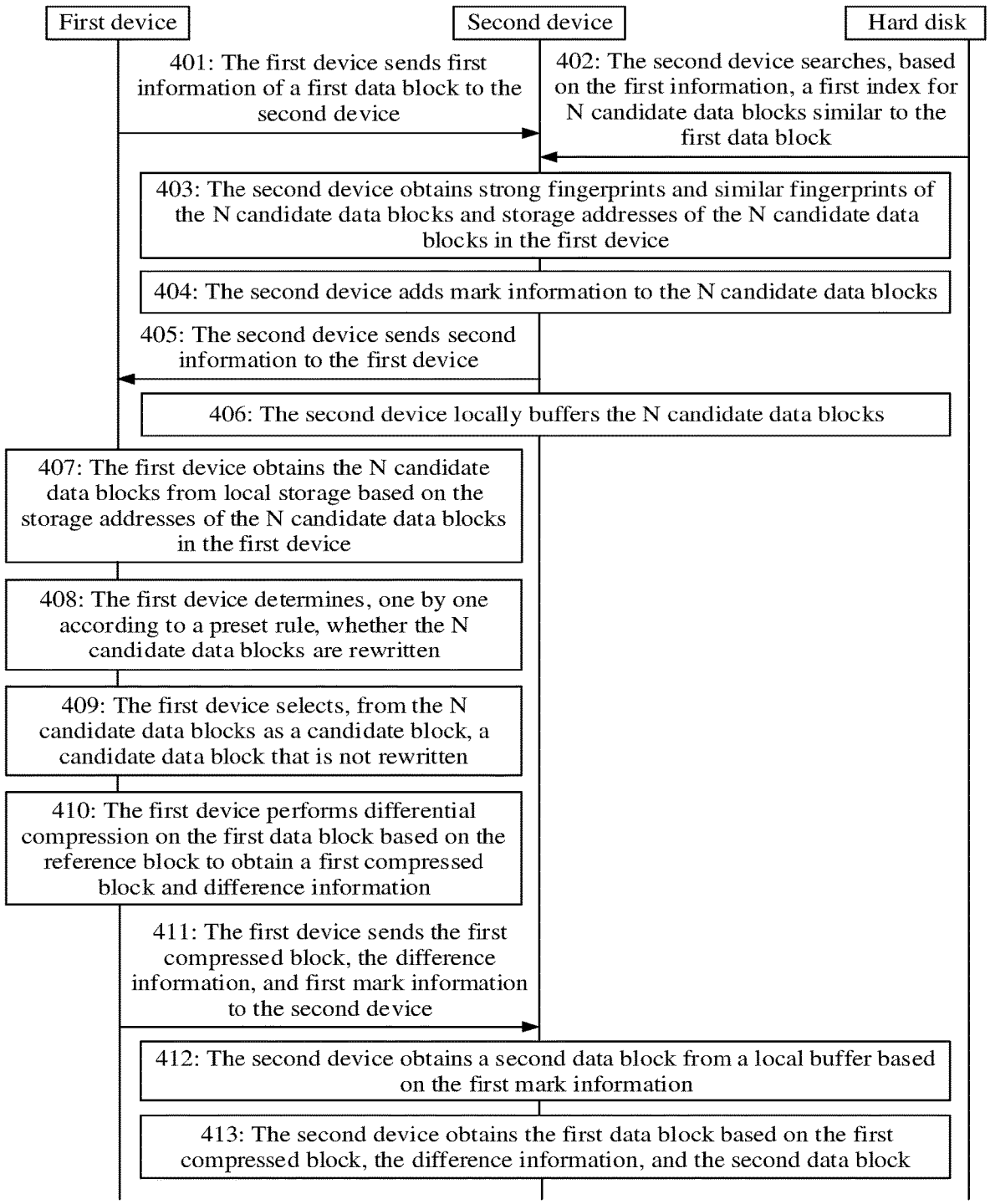
FIG. 4 is a schematic diagram of another implementation of a data transmission method according to an embodiment of this application.

As shown in FIG. 4, Embodiment 3 of a data transmission method provided in this application includes the following steps.

401: A first device sends first information of a first data block to a second device.

In this embodiment, for this step, refer to the foregoing step 201. Details are not described herein again.

402: The second device searches, based on the first information, a first index for N candidate data blocks similar to the first data block.

In this embodiment, the second data block in Embodiment 2 is one of the N candidate data blocks, and N is a positive integer greater than 1. The N candidate data blocks are obtained by the second device from the foregoing M target data blocks. For a step of obtaining each candidate data block in the N candidate data blocks, refer to the manner described in step 302. Details are not described herein again.

Optionally, after obtaining the N candidate data blocks, the second device sorts the N candidate data blocks based on similarities between the N candidate data blocks and the first data block, to obtain sorting information. The sorting information may be that a candidate data block that is most similar to the first data block to a candidate data block that is least similar to the first data block are sequentially arranged in descending order. The second device may determine a similarity between a candidate data block and the first data block by using a similarity between similar fingerprints. A higher similarity between a similar fingerprint of the candidate data block and a similar fingerprint of the first data block indicates that the candidate data block is more similar to the first data block.

403: The second device obtains strong fingerprints and similar fingerprints of the N candidate data blocks and storage addresses of the N candidate data blocks in the first device.

In this embodiment, the strong fingerprint and the similar fingerprint are data recorded in the first index, and the second device may directly obtain the strong fingerprint and the similar fingerprint from the first index. For the storage addresses of the N candidate data blocks in the first device, the method provided in this embodiment of this application can be applied to two scenarios: inter-device data synchronization and data backup. In a data synchronization scenario, storage addresses of a synchronized data block in the first device and the second device are consistent. In a data backup scenario, storage addresses of a backed-up data block in the first device and the second device are inconsistent. Therefore, for the two different cases, two different methods need to be provided, so that second information includes a storage address of the second data block in the first device. For a specific implementation, refer to the description in step 203. Details are not described herein again.

404: The second device adds mark information to the N candidate data blocks.

In this embodiment, each piece of mark information is used to uniquely mark one of the N candidate data blocks, so that the second device and the first device can identify the corresponding candidate data block based on the mark information.

Optionally, a specific implementation in which the second device adds the mark information to the N candidate data blocks is as follows: The second device sorts the N candidate data blocks, the second device allocates a sequence number to each candidate data block based on a sorting sequence of the N candidate data blocks, and the second device uses the sequence number as mark information of the candidate data block. A manner in which the second device sorts the N candidate data blocks may be sorting in a sequence in which the N candidate data blocks are found in the first index, or may be sorting according to any other preset rule. This is not limited in this embodiment of this application.

405: The second device sends second information to the first device.

In this embodiment, the second information includes the strong fingerprints and the mark information that are of the N candidate data blocks and the storage addresses of the N candidate data blocks in the first device. Optionally, the second information may further include the sorting information generated in step 402. The second device sends the second information to the first device, so that the first device performs differential compression based on the second information.

406: The second device locally buffers the N candidate data blocks.

In this embodiment, the second device buffers the second data block in a local buffer, to perform a restoration operation on the first data block in a subsequent step. Optionally, the second data block may be buffered in the local buffer.

407: The first device obtains the N candidate data blocks from local storage based on the storage addresses of the N candidate data blocks in the first device.

In this embodiment, the first device obtains the N candidate data blocks from the local storage based on the storage addresses recorded in the second information.

408: The first device determines whether the N candidate data blocks are rewritten.

In this embodiment, the second information includes a strong fingerprint of each candidate data block, and the strong fingerprint is used to record a data attribute of the corresponding candidate data block. The first device compares a data attribute of the candidate data block obtained from the local storage with the data attribute recorded by using the strong fingerprint, to determine whether the candidate data block is rewritten in the first device.

For example, a candidate data block A is one of the N candidate data blocks, and the second information records a strong fingerprint A of the candidate data block A. After obtaining the candidate data block A from the local storage, the first device calculates a strong fingerprint A' of the candidate data block A. In this case, if the strong fingerprint A' is the same as the strong fingerprint A, it indicates that the candidate data block A is not rewritten, and the candidate data block A still records original information. In this case, the candidate data block A may form a similar block of the first data block. On the contrary, if the strong fingerprint A' is different from the strong fingerprint A, it indicates that the candidate data block A has been rewritten in the first device. In this case, the candidate data block A is no longer a similar block of the first data block.

409: The first device selects, from the N candidate data blocks as a reference block, a candidate data block that is not rewritten.

In this embodiment, according to the foregoing preset rule, the first device selects, from the N candidate data blocks as the reference block, a candidate data block whose strong fingerprint is the same as the strong fingerprint in the second information. Because the strong fingerprint is used to describe the data block, whether the candidate data block found by the second device is rewritten in the first device can be determined by using the strong fingerprint.

In this embodiment, all the N candidate data blocks are local data blocks in the second device that are similar to the first data block. The second device sends information about the N candidate data blocks to the first device. The first device determines, according to the foregoing method, whether the N candidate data blocks are locally rewritten. For data blocks that are not rewritten, the first device obtains one of the data blocks as the reference block.

Optionally, when the second information includes the sorting information, the first device obtains the strong fingerprints of the N candidate data blocks one by one based on the sorting information, to determine whether the candidate data blocks are locally rewritten. The first device uses, as the reference block, the first determined candidate data block that is not rewritten, and performs a subsequent differential compression step on the first data block by using the reference block.

Further, if the first device does not find, from the N candidate data blocks, a candidate data block whose strong fingerprint is the same as the strong fingerprint recorded in the second information, it indicates that all the N candidate data blocks have been locally rewritten in the first device. In this case, the first device directly compresses the first data block into a second compressed block and sends the second compressed block to the second device. After obtaining the second compressed block, the second device locally decompresses the second compressed block into the first data block, and does not perform subsequent steps 410 to 413.

410: The first device performs differential compression on the first data block based on the reference block to obtain a first compressed block and difference information.

In this embodiment, the first compressed block includes a difference part between the first data block and the reference block, and the difference information is used to describe a status of a difference between the first data block and the reference block. For a specific implementation, refer to step 204. Details are not described herein again.

411: The first device sends the first compressed block, the difference information, and first mark information to the second device.

In this embodiment, the reference block is one of the N candidate data blocks. The first device selects, from the N candidate data blocks as the reference block, a candidate data block that is not locally rewritten, to perform differential compression on the first data block. The first mark information is used to mark the second data block, and the first mark information is mark information added by the second device to the second data block in step 404. The second device may learn, based on the first mark information, that the reference block selected by the first device from the N candidate data blocks is a data block that is the same as the second data block, and the first device performs differential compression on the to-be-sent first data block based on the reference block.

412. The second device obtains the second data block from the local buffer based on the first mark information.

In this embodiment, after the second device sends the N candidate data blocks to the first device, the second device locally buffers the N candidate data blocks. When the second device obtains the first mark information sent by the first device, the second device may learn that the first device selects the second data block from the N candidate data blocks to perform differential compression. In this case, the second device obtains the second data block from the local buffer based on the first mark information, to perform a subsequent data restoration step.

413. The second device obtains the first data block based on the first compressed block, the difference information, and the second data block.

In this embodiment, for a specific implementation step in which the second device obtains the first data block based on the first compressed block, the difference information, and the second data block, refer to the foregoing step 206. Details are not described herein again.

In this embodiment, to avoid that a similar block found by the second device is rewritten in the first device, the second device searches for a plurality of candidate data blocks similar to the first data block, and sends information about these candidate data blocks to the first device, so that the first device selects, from these candidate data blocks as the reference block, a data block that is not rewritten, to perform differential compression on the to-be-sent first data block, and then the first device sends the mark information of the second data block to the second device, where the second data block marked by the mark information and the reference block are a same data block. In this way, the second device knows which candidate data block is selected by the first device for differential compression. This ensures smooth data restoration of the second device.

Further, after obtaining the first data block, the second device updates information about the first data block in the first index, including a similar fingerprint of the first data block, a strong fingerprint of the first data block, a storage address of the first data block in the first device, and a correspondence between (the similar fingerprint+the strong fingerprint) and the storage address.

It should be noted that, in the foregoing working process, the second information fed back by the second device to the first device may alternatively be the following two types of information: 1. The second device finds, in the first index, a second data block that is completely the same as the first data block. 2. The second device does not find, in the first index, a data block that is the same as or similar to the first data block. In case 1, after receiving the second information, the first device directly skips current processing on the first data block, and the second device needs only to locally obtain the second data block as the first data block. In case 2, after receiving the second information, the first device directly compresses the first data block into a second compressed block and sends the second compressed block to the second device.

Case 1 is a similarity-based deduplication technology in the conventional technology, and case 2 is a data compression and transmission technology in the conventional technology. A person skilled in the art can obtain specific implementations in the two cases. Therefore, details are not described in this embodiment of this application.

Figure 5A:
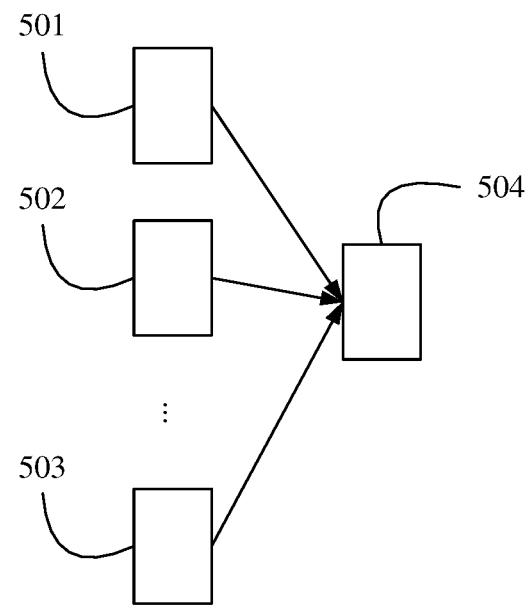
FIG. 5a is a diagram of a system architecture of another application scenario of a data transmission method according to an embodiment of this application.

The foregoing describes the first case provided in embodiments of this application: An index is stored in a target end, and the target end searches for a similar block. This manner can achieve a good working effect in a more complex system architecture. For example, in an architecture shown in FIG. 5a, one target end simultaneously receives data sent by a plurality of source ends. In FIG. 5a, there is a first device 501, a first device 502, and a first device 503. The first device 501 to the first device 503 are same source ends (that is, first devices). It is assumed that there are p first devices, p is a positive integer greater than 1, and a second device 504 is configured to back up or synchronize data of the p first devices. A first index is set in the second device 504, and is used to record data block information received from the first device 501. A second index is set in the second device 504, and is used to record data block information received from the first device 502. By analogy, a $P^{th}$ index is set in the second device 504, and is used to record data block information received from the first device 503.

It can be learned that P indices corresponding to P first devices are set on the target-end second device, so that the second device can perform the data transmission method provided in embodiments of this application on the P first devices. Each of the P first devices and the second device form a data transmission link, and similar block searching on all links may be performed by the second device. This reduces service pressure of the first device and improves working efficiency of the data transmission method provided in this application.

Figure 5B:
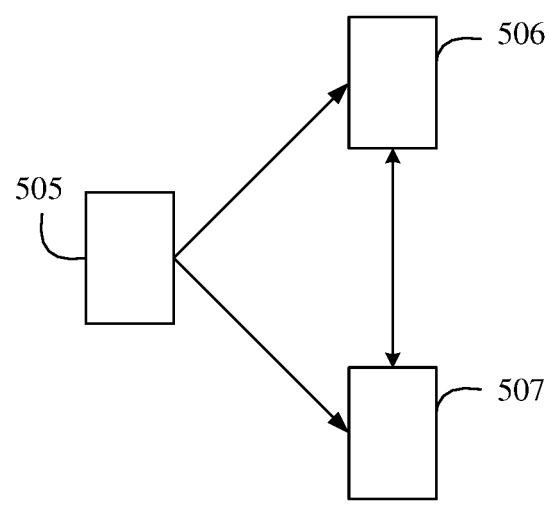
FIG. 5b is a diagram of a system architecture of another application scenario of a data transmission method according to an embodiment of this application.

Further, in an architecture shown in FIG. 5b, Q second devices obtain a data block sent by a first device, where Q is a positive integer greater than 1. There may be one or more first devices. This is not limited in this embodiment of this application. In FIG. 5b, the Q second devices may be considered as Q data nodes, and each data node includes partial content of a first index. For example, when Q=2, a second device 506 and a second device 507 are included. The second device 506 and the second device 507 are two same second devices, a first index A in the second device 506 stores content in which a tail of a strong fingerprint is an odd number in the first index, and a first index B in the second device 507 stores content in which a tail of a strong fingerprint is an even number in the first index. When a first device 505 sends first information to the second devices, if a tail of a strong fingerprint in the first information is an odd number, the second device 506 performs searching to obtain, from the first index A based on the first information, information about a second data block similar to a first data block; or if a tail of a strong fingerprint in the first information is an even number, the second device 507 performs searching to obtain, from the first index B based on the first information, information about a second data block similar to a first data block. Therefore, a plurality of second devices share pressure of searching the first index, and load balancing between the second devices is implemented in the manner of deploying the second devices in a cluster.

A data transmission method provided in the embodiments includes: A first device sends first information of a first data block to a second device, where the first data block is a data block to be sent by the first device to the second device, and the first information is used to describe an attribute of the first data block; the second device searches, based on the first information, a first index for a second data block similar to the first data block, where the first index is used to record information about a data block that has been received by the second device from the first device; the second device sends second information of the second data block to the first device, where the second information is used to describe an attribute of the second data block; the first device locally obtains a reference block based on the second information, where the reference block is the same as the second data block; the first device compresses a difference part of the first data block relative to the reference block, to obtain first compressed information; the first device sends the first compressed information to the second device; and the second device obtains the first data block based on the first compressed information and the second data block. In this way, a similarity-based deduplication technology is implemented. For a to-be-sent data block, if a transmitted data block is similar to the to-be-sent data block, only a difference part between the two data blocks is transmitted. This effectively reduces data links and improves transmission efficiency of a data synchronization technology.

It should be noted that, in an actual working process, an index may not be deployed at a target end (a receiving end), but be deployed at a source end (a sending end). For example, in a backup scenario, service pressure at a target end is low. In this case, an index may be deployed at the target end to fully utilize computing resources at the target end. In a replication scenario, data needs to be synchronized between a source end and a target end. In this case, an index may be deployed at the source end to reduce interaction overheads. The foregoing embodiments describe a working scenario in which an index is set at a target end. With reference to the accompanying drawings in this specification, the following describes in detail a working scenario in which an index is deployed at a source end.

2. An index is stored in a source end, and the source end searches for a similar block.

Figure 6:
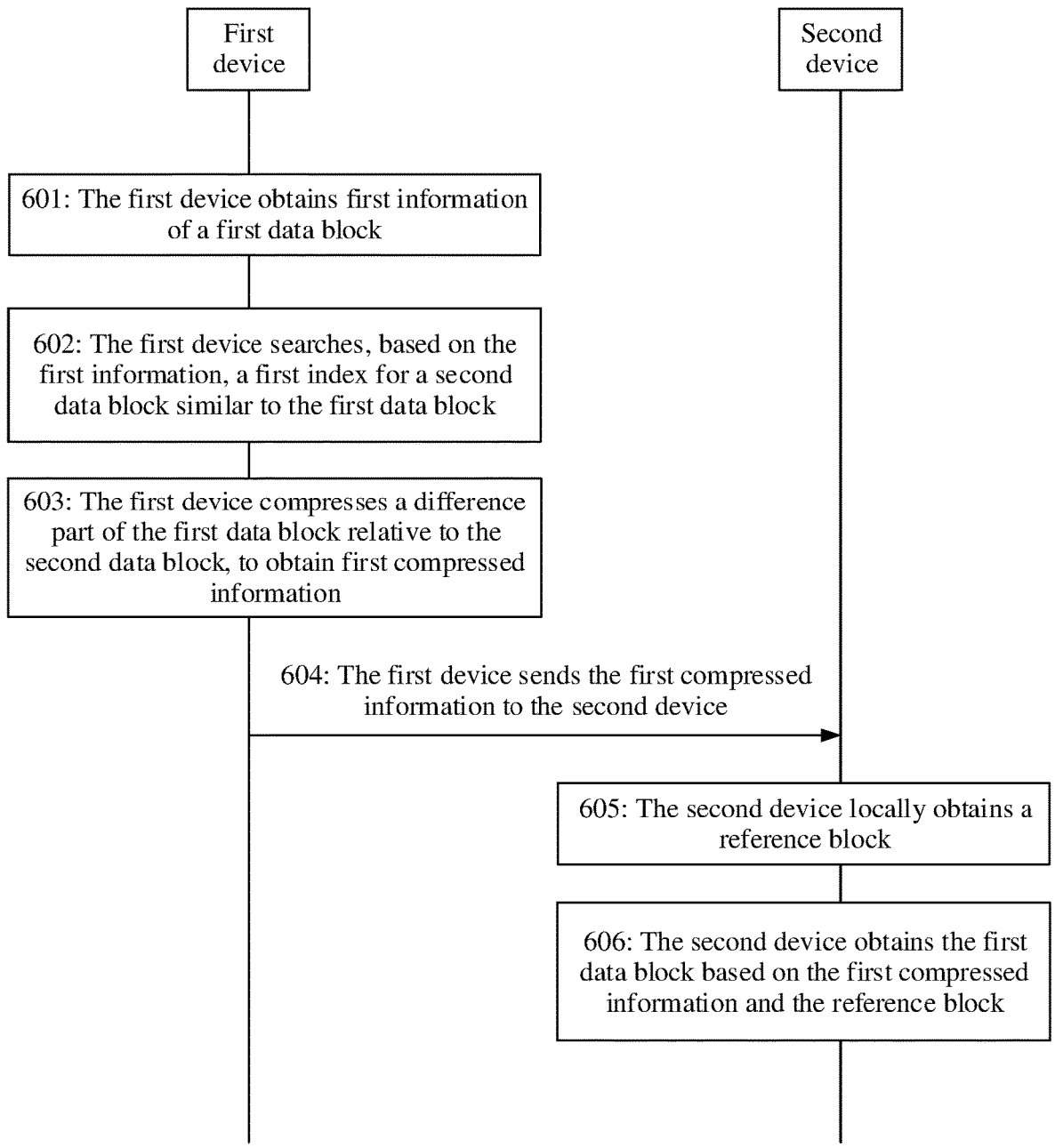
FIG. 6 is a schematic diagram of another implementation of a data transmission method according to an embodiment of this application.

As shown in FIG. 6, Embodiment 4 of a data transmission method provided in an embodiment of this application includes the following steps.

601: A first device obtains first information of a first data block.

In this embodiment, the first device is an end that sends data, the first data block is a to-be-sent data block, and the first information is used to describe an attribute of the first data block.

Further, the first information may include a first address, a first strong fingerprint, and a first similar fingerprint that are of the first data block, the first address is a storage address of the first data block in the first device, the first strong fingerprint is a strong hash value of the first data block, and the first similar fingerprint is a weak hash value of the first data block. A strong fingerprint (FP) is used to describe an attribute of a data block, and whether the data block is rewritten may be determined through comparison on the strong fingerprint of the data block. A similar fingerprint (SFP) is used to determine a similarity between data blocks through comparison. When similar fingerprints of two data blocks are the same, it may be determined that the two data blocks are similar.

602: The first device searches, based on the first information, a first index for a second data block similar to the first data block.

In this embodiment, the first index is used to record information about a data block that has been sent by the first device to a second device. Each time the first device sends a new data block to the second device, the first index is updated. The second device is configured to receive the data block sent by the first device.

Optionally, a first correspondence between a storage address of a data block in the first device and a similar fingerprint and a strong fingerprint that are of the data block is recorded in the first index. A process of searching for the second data block may specifically include the following steps.

1. The first device searches the first index for a second similar fingerprint that is the same as the first similar fingerprint.

In this embodiment, the second similar fingerprint is a weak hash value of the second data block. When two data blocks are similar (that is, partially the same), there is a high probability that similar fingerprints are the same. Therefore, if the second similar fingerprint that is the same as the first similar fingerprint is found in the first index, it may be determined that the second data block corresponding to the second similar fingerprint and the first data block are similar blocks.

2. The first device obtains a second address from the first correspondence based on the second similar fingerprint.

In this embodiment, the second address is a storage address of the second data block in the first device. Because the first correspondence between a similar fingerprint and a storage address is recorded in the first index, the first device can find the storage address of the second data block in the first device from the first index based on the second similar fingerprint.

3. The first device obtains the second data block based on the second address.

In this embodiment, the first device obtains the second data block, so that a similar block is obtained. The second data block is a data block that is similar to the current to-be-sent first data block and that is in the data block that has been sent by the first device to the second device.

603: The first device compresses a difference part of the first data block relative to the second data block, to obtain first compressed information.

In this embodiment, the first compressed information is used to record difference information between the first data block and the second data block. Optionally, the first compressed information includes a first compressed block and difference information. The first compressed block includes the difference part between the first data block and the second data block, and the difference information is used to describe a status of a difference between the first data block and the second data block. Optionally, this step may be specifically implemented by using the following steps.

1. The first device compares the first data block with the second data block to obtain the difference information.

In this embodiment, the status of the difference between the first data block and the second data block may be that former parts of data are partially the same, may be that latter parts of data are partially the same, may be that former parts of data are partially the same and latter parts of data are partially the same, or may be that parts of data in the two data blocks are alternately the same. The first device obtains the difference status and records the difference status in the difference information.

2. The first device performs differential compression on the first data block based on the difference information to obtain the first compressed block.

In this embodiment, based on the difference information, the first device deletes a part that is in the first data block and that is repeated with the second data block, so that similarity-based deduplication of the first data block is implemented. The obtained first compressed block records only the difference part between the first data block and the second data block. In addition, how the difference part is specifically different from the second data block is recorded in the difference information. It should be noted that a differential compression technology is a well-known technology, and a person skilled in the art may select different differential compression methods based on actual requirements to perform differential compression on the first data block based on the second data block. This is not limited in this embodiment of this application.

604: The first device sends the first compressed information to the second device.

In this embodiment, optionally, the first device sends the first compressed block and the difference information to the second device, so that the second device obtains the first data block based on the first compressed block, the difference information, and a local reference block in the second device. The local reference block in the second device and the second data block stored in the first device are a same data block. After the first device sends the second data block to the second device, the second data block is locally stored. For ease of distinguishing between same data blocks stored in two different devices, the second data block sent by the first device to the second device is denoted as a reference block. Because the first compressed block includes only information about the difference part between the first data block and the second data block, and the difference information is merely description information, a data amount of the first compressed block and the difference information is much smaller than that of the first data block. This effectively reduces an amount of transmitted data and reduces data transmission links.

Optionally, the first device further sends a storage address of the reference block in the second device to the second device, so that the second device obtains the reference block from local storage based on the address. The method provided in this embodiment of this application can be applied to two scenarios: inter-device data synchronization and data backup. In a data synchronization scenario, storage addresses of a synchronized data block in the first device and the second device are consistent. In a data backup scenario, storage addresses of a backed-up data block in the first device and the second device are inconsistent. Therefore, for the two different cases, the following two different methods need to be provided, so that the first device can send the storage address of the second data block in the second device to the second device.

1. Data Synchronization Scenario

In the data synchronization scenario, because storage addresses of a synchronized data block in the first device and the second device are consistent, the first device directly sends the second address to the second device. The second address of the second data block in the first device is the storage address of the reference block in the second device. The reference block and the second data block are a same data block. For ease of differentiation, the data block stored in the first device is denoted as the second data block, and the data block stored in the second device is denoted as the reference block.

2. Data Backup Scenario

In the data backup scenario, storage addresses of a backed-up data block in the first device and the second device are inconsistent. In this case, in the foregoing step, after sending a data block to the second device, the first device obtains a feedback message sent by the second device, where the feedback message is used to record a storage address of the data block in the second device. For example, after the first device sends the second data block to the second device, the second data block locally stored in the first device is recorded as the second data block, and the second data block sent to the second device is recorded as the reference block. The first device obtains a second feedback message from the second device, where the second feedback message is used to record a third address of the reference block stored in the second device. The first device records the third address in the first index. In this scenario, the first correspondence includes a correspondence between (a strong fingerprint+a similar fingerprint) and (a local storage address+a storage address in the second device) of a data block. The first device updates the third address into the first correspondence, so that the first device knows a storage address, in the second device, of each data block that has been sent to the second device.

In the data backup scenario, in step 604, the first device sends the third address to the second device.

605: The second device locally obtains the reference block.

In this embodiment, the second device may obtain the reference block from a local buffer based on the storage address sent by the first device. For example, in the foregoing data synchronization scenario, the second device obtains the reference block from the local storage based on the second address. In the foregoing data backup scenario, the second device obtains the reference block from the local storage based on the third address.

Optionally, the second device may also obtain mark information from the first device, where the mark information is used to mark the reference block; and locally obtain the reference block by using the mark information. Because a data volume of the mark information is smaller than that of address information, an amount of to-be-transmitted data can be further reduced in this manner.

606: The second device obtains the first data block based on the first compressed information and the reference block.

In this embodiment, optionally, the first compressed information includes the first compressed block and the difference information, the first compressed block records data that is in the first data block and that is different from the second data block, and the difference information records a specific status of the difference between the first data block and the second data block. In addition, because the reference block and the second data block are a same data block, the second device may restore the second data block based on the first compressed block, the difference information, and the reference block. For example, based on a record in the difference information, a size of the first data block is 100 bytes. Data in first 30 bytes of the first data block is different from that of the second data block, and data in last 70 bytes of the first data block is the same as that of the second data block. Because the reference block and the second data block are a same data block, in this case, the second device may replace, based on the difference information, data in first 30 bytes of the reference block with data recorded in first difference data, to obtain the first data block.

Optionally, in the data backup scenario, the following step is further performed.

The second device sends a first feedback message to the first device.

In this embodiment, the first feedback message is used to record a fourth address of the first data block stored in the second device. In the backup scenario, the second device needs to feed back a storage address of each received data block in the second device to the first device. Therefore, after locally restoring the first data block, the second device needs to feed back a local storage address of the first data block to the first device, and the first device updates a correspondence between (a strong fingerprint+a similar fingerprint) and (a local storage address+a storage address in the second device) of the first data block in the local first index.

Further, in a working process of the second device, the reference block may be rewritten, and consequently the second device cannot locally obtain the reference block based on the address sent by the first device. In this case, the second device needs to send a failure message to the first device. The failure message is used to indicate that the second device does not locally find the second data block. In this case, after directly compressing the first data block into a second compressed block, the first device sends the second compressed block to the second device. The second compressed block includes all data in the first data block. A manner of compressing the first data block into the second compressed block may be any compression manner in the conventional technology. This is not limited in this application.

In this embodiment, according to the method, a case in which data transmission fails when similarity-based deduplication of a to-be-sent data block cannot be implemented because data is rewritten in the second device is avoided. When a similar block sent by the first device is rewritten in the second device, the second device notifies, by using a failure message, the first device to directly send a compressed block of the to-be-sent data block. In this way, the problem is overcome.

In this embodiment, the first device searches the first index. The first device obtains the first information of the first data block, where the first data block is a data block to be sent by the first device to the second device, the second device is configured to receive the data block sent by the first device, and the first information is used to describe the attribute of the first data block; the first device searches, based on the first information, the first index for the second data block similar to the first data block, where the first index is used to record information about a data block that has been sent by the first device to the second device; the first device compresses the difference part of the first data block relative to the second data block, to obtain the first compressed information; and the first device sends the first compressed information to the second device, so that the second device obtains the first data block based on the first compressed information. In this way, a similarity-based deduplication technology is implemented. For a to-be-sent data block, if a transmitted data block is similar to the to-be-sent data block, only a difference part between the two data blocks is transmitted. This effectively reduces data links and improves transmission efficiency of a data synchronization technology.

It should be noted that, in Embodiment 4, the first index is used to record information about a data block that has been transmitted to the second device, and specifically includes a correspondence between a storage address (logical block address, LBA) and each of a strong fingerprint (FP) and a similar fingerprint (SFP) that are of the data block. The strong fingerprint may be implemented by using a secure hash algorithm 1 (SHA1), and the correspondence may be abbreviated as (SFP+SHA1)→LBA. Because the first device needs to send a large amount of data to the second device, the first index occupies relatively large memory space. In a specific working process, the first index may be stored in an external storage device. For example, the first device is connected to a hard disk through an external interface, a KV database is constructed in the hard disk by using a LevelDB technology, and the KV database implements a function of the first index. When the first device needs to search the first index, the second device may access the KV database in the external hard disk through the external interface, to implement the search.

Correspondingly, based on the implementation of the first index, the data transmission method provided in this embodiment of this application is implemented by using the following steps. For ease of understanding, the following provides detailed descriptions with reference to the accompanying drawings in this specification.

Figure 7:
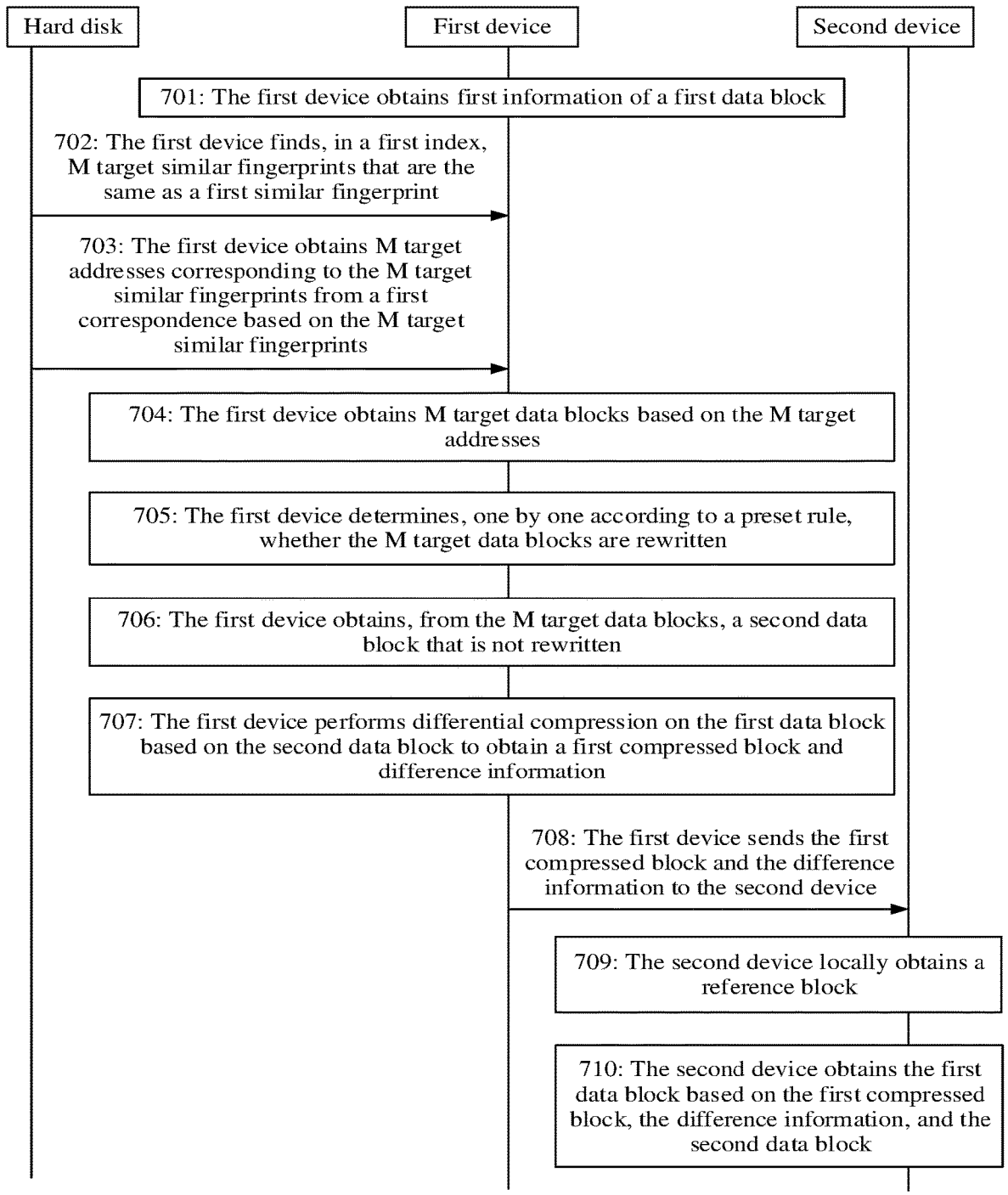
FIG. 7 is a schematic diagram of another implementation of a data transmission method according to an embodiment of this application.

As shown in FIG. 7, Embodiment 5 of a data transmission method provided in this application includes the following steps.

701: A first device obtains first information of a first data block.

In this embodiment, for a specific implementation of this step, refer to the foregoing step 601. Details are not described herein again.

702: The first device finds, in a first index, M target similar fingerprints that are the same as a first similar fingerprint.

In this embodiment, the first similar fingerprint is a similar fingerprint of the first data block, and the first device finds, in the first index based on the first similar fingerprint, the M target similar fingerprints that are the same as the first similar fingerprint, where M is a positive integer greater than 1.

Specifically, the first index is stored in an external storage device, for example, a hard disk connected to the first device through an external interface. The first device reads, through the external interface, the first index running on the hard disk, to find the M target similar fingerprints.

It should be noted that, during specific working, after sending a data block to a second device, the first device may rewrite the data block, and such rewriting may not be updated in a timely manner in the first index. For example, the first device sends a data block A to the second device. In this case, the first device records information about the data block A in the first index, and the information includes a similar fingerprint A and a storage address A. In a working process of the first device, the data block A is rewritten into a data block A'. In this case, the first device does not update information about the data block A' in the first index. Subsequently, when preparing to send a data block B to the second device, the first device obtains a similar fingerprint B of the data block B, and finds, in the first index, that the similar fingerprint B is the same as the similar fingerprint A. This indicates that the data block A and the data block B are similar data blocks. However, in this case, because the data block A has been rewritten, a data block obtained by the first device based on a storage address is no longer the data block A, but the rewritten data block A'. In this case, the data block A' is no longer a similar data block of the data block B. Therefore, after finding the similar data block in the first index, the first device needs to perform a corresponding verification step, to determine whether the obtained data block is rewritten.

Further, because the first index is stored in the external storage device, each time of reading needs to use an external data interface. To improve query efficiency and avoid repeated reading, the first device may query information about a plurality of data blocks similar to the first data block at a time, and then verify the data blocks one by one to select a data block that is not rewritten. Therefore, in step 702, the first device needs to find, in the first index, the M target similar fingerprints that are the same as the first similar fingerprint.

703: The first device obtains M target addresses corresponding to the M target similar fingerprints from a first correspondence based on the M target similar fingerprints.

In this embodiment, the first index records a correspondence between a similar fingerprint and a storage address of each data block, and the storage address includes a local storage address of the data block in the first device. According to the correspondence, the first device may find, from the first index based on the M target similar fingerprints, storage addresses that are of data blocks in the first device and that are corresponding to the M target similar fingerprints.

704: The first device obtains M target data blocks based on the M target addresses.

In this embodiment, the first device may obtain the M target data blocks from the local storage based on the M obtained target addresses.

705: The first device determines, one by one according to a preset rule, whether the M target data blocks are rewritten.

In this embodiment, the preset rule is specifically: determining whether a strong fingerprint of a target data block is the same as a strong fingerprint recorded in the first index, where if the strong fingerprints are different, it indicates that the data block is rewritten; or if the strong fingerprints are the same, it indicates that the data block is not rewritten. Because the strong fingerprint is used to record a data attribute of the data block, whether the data block is rewritten may be determined based on whether the strong fingerprint is changed.

In a specific working process, the first index records a correspondence between (a strong fingerprint+a similar fingerprint) and a storage address. The first device may obtain, based on the M target similar fingerprints, M target strong fingerprints corresponding to the M target similar fingerprints. The strong fingerprint may be implemented by using SHA1, and the strong fingerprint is used to record a data attribute of a data block. Therefore, the first device may determine, by using the strong fingerprint, whether the obtained target data block is rewritten.

706: The first device obtains, from the M target data blocks, a second data block that is not rewritten.

In this embodiment, in the foregoing manner, the first device determines, one by one, whether the M target data blocks are rewritten. If the $(M-1)^{th}$ data block in the M target data blocks is rewritten, the $(M-1)^{th}$ data block is discarded and the $M^{th}$ data block is obtained. After a data block that is not rewritten is obtained, the data block is determined as the second data block similar to the first data block.

It should be noted that the first device may obtain, from the M target data blocks, a plurality of target data blocks that are not rewritten. In this case, the first device may obtain any one of the target data blocks as the second data block, or may use, as the second data block based on a determining sequence, the first obtained target data block that is not rewritten, and does not perform subsequent determining on another target data block.

Preferably, the first device may obtain, from the M target data blocks, N candidate data blocks similar to the first data block, then sort similarities between the N candidate data blocks and the first data block, and obtain a candidate data block with a highest similarity to the first data block as the second data block. The first device may determine a similarity between a candidate data block and the first data block by using a similarity between similar fingerprints. A higher similarity between a similar fingerprint of the candidate data block and a similar fingerprint of the first data block indicates that the candidate data block is more similar to the first data block.

Further, according to the foregoing step, the first device knows which data blocks in the M target data blocks are rewritten. In this case, the first device needs to update information about the rewritten data blocks in the first index, to improve accuracy of the first index.

Specifically, in the foregoing step, if the first device determines that the $(M-1)^{th}$ data block has been rewritten, the first device updates, in the first index, an entry sequence of the $(M-1)^{th}$ target data block in the first index, a similar fingerprint of the $(M-1)^{th}$ target data block, and a strong fingerprint of the $(M-1)^{th}$ target data block.

For subsequent steps 707 to 710, refer to the foregoing steps 603 to 606. Details are not described herein again.

Further, when sending the storage address of the reference block in the second device to the second device, the first device may further send a strong fingerprint of the reference block to the second device, so that the second device determines, based on the strong fingerprint, whether the reference block in the local storage is rewritten. If the reference block is rewritten, the second device sends a failure message to the first device, where the failure message is used to indicate that the second data block locally stored in the second device has been rewritten. In this case, after directly compressing the first data block into a second compressed block, the first device sends the second compressed block to the second device, where the second compressed block includes all data in the first data block. A manner of compressing the first data block into the second compressed block may be any compression manner in the conventional technology. This is not limited in this application.

In this embodiment, when querying, in the first index, a similar fingerprint that is the same as the first similar fingerprint, the first device obtains a plurality of target similar fingerprints at a time, then obtains corresponding target similar blocks based on the target similar fingerprints, and selects, from the plurality of target similar blocks as the second data block, a data block that is not rewritten, to prevent a case in which similarity-based deduplication fails because a data block is rewritten in the first device.

It should be noted that, in the foregoing working process, after the first device searches the first index based on the first information, the following two results may occur: 1. The first device finds, in the first index, a second data block that is completely the same as the first data block. 2. The first device does not find, in the first index, a data block that is the same as or similar to the first data block. In case 1, the first device may directly send description information of the second data block to the second device, so that the second device directly obtains the second data block from the local storage based on the description information as the first data block. In case 2, the first device directly compresses the first data block into the second compressed block and sends the second compressed block to the second device.

Case 1 is a similarity-based deduplication technology in the conventional technology, and case 2 is a data compression and transmission technology in the conventional technology. A person skilled in the art can obtain specific implementations in the two cases. Therefore, details are not described in this embodiment of this application.

Figure 8:
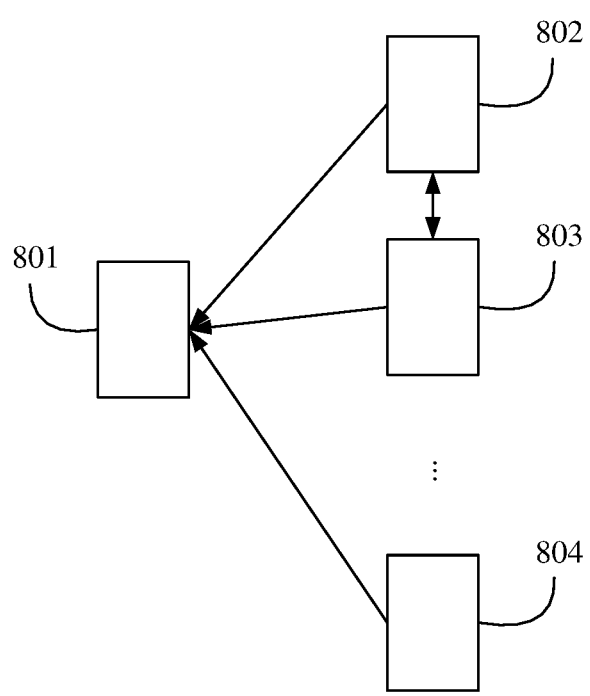
FIG. 8 is a diagram of a system architecture of another application scenario of a data transmission method according to an embodiment of this application.

The foregoing describes the second case provided in embodiments of this application: An index is stored in a source end, and the source end searches for a similar block. This manner can achieve a good working effect in a more complex system architecture. For example, in an architecture shown in FIG. 8, a source end sends data to a plurality of target ends at the same time. In FIG. 8, a first device 801 is connected to a second device 802, a second device 803, and a second device 804, and the second device 802 to the second device 804 are all same second devices. The first device 801 uniformly searches the first index. This reduces data link transmission and improves search efficiency.

Further, in FIG. 8, the second device 802 to the second device 804 may be in one equipment room, or may be relatively close to each other. In this case, there is a relatively large transmission bandwidth between N second devices, the N second devices are not limited by link transmission, and the N second devices may transmit data blocks to each other. For example, the first device 801 needs to send a first data block to the second device 803. In this case, if the first device 801 finds, in the first index, that a second data block that has been sent to the second device 802 is similar to the first data block, the first device 801 sends a first compressed block and difference information to the second device 803 in the foregoing manner, and further sends indication information to the second device 803, where the indication information is used to indicate the second device 803 to obtain the second data block from the second device 802, so that the second device 803 can locally restore the first data block based on the second data block, the first compressed block, and the difference information. In this scenario, a transmission bandwidth between the second device 803 and the second device 802 is relatively large, so that the second devices can transmit, to each other, data blocks that have been received from the first device 801. This further improves data transmission efficiency.

The foregoing describes in detail the two manners provided in embodiments of this application. The first manner is a working manner in which an index is stored in a target end (a second device), and the target end searches for a similar block. The second manner is a working manner in which an index is stored in a source end (a first device), and the source end searches for a similar block. The foregoing two manners may be both implemented by using the following hardware structure.

Figure 9:
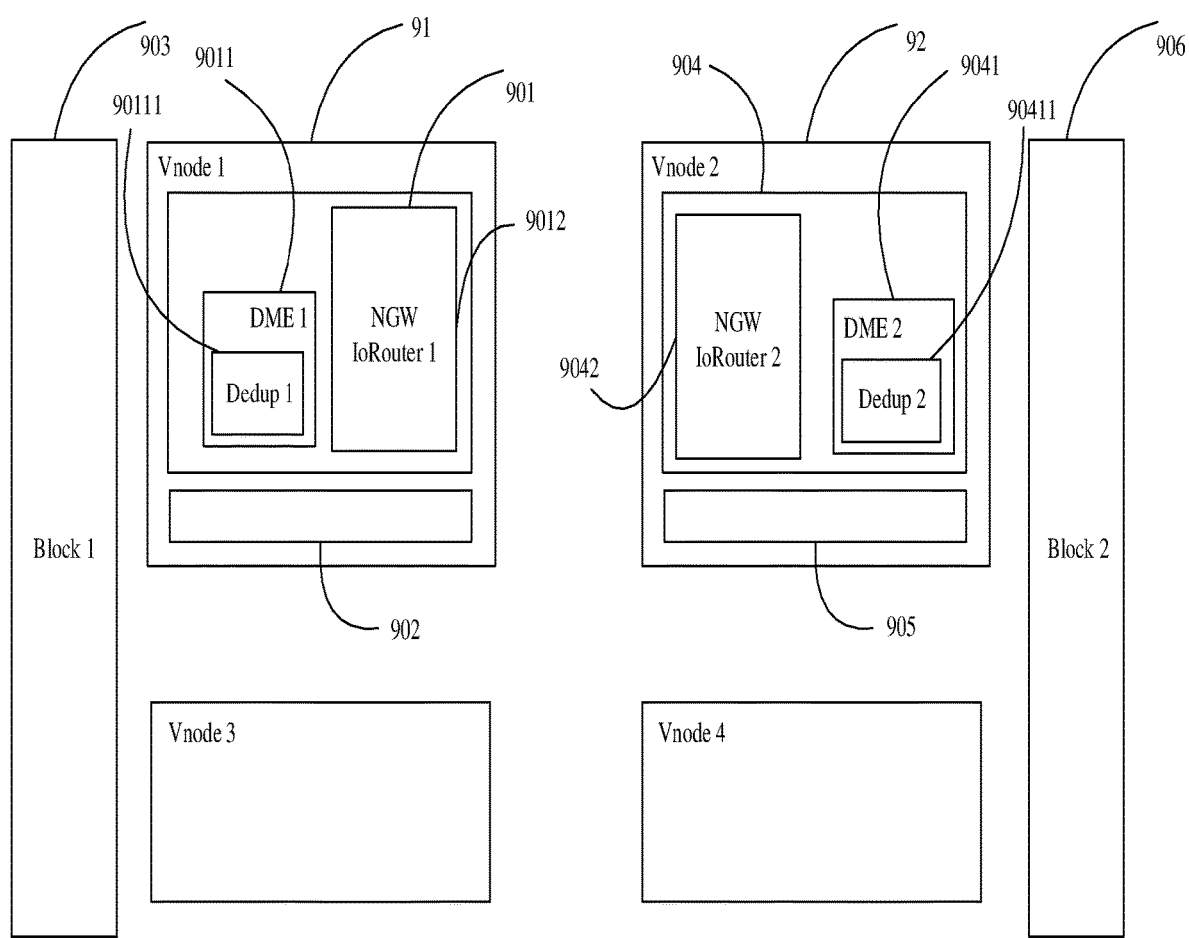
FIG. 9 is a diagram of a system apparatus of another application scenario of a data transmission method according to an embodiment of this application.

As shown in FIG. 9, the source end and the target end each may be implemented by using n nodes vnode. The source end and the target end each may include only one node, or may include a plurality of nodes. In FIG. 9, a plurality of nodes are used for description, so that cluster deployment of nodes is implemented, and load balancing query described in FIG. 5b can be performed. A node 91 of a first device (source end) includes a first replication module 901 and a first interface module 902. The first replication module 901 is configured to perform data replication (which may be data synchronization or data backup) with a second device, and the first interface module 902 is configured to communicate with another node. A communications interface is disposed between the first replication module 901 and a first storage module Block 903, so that the first replication module 901 can obtain a to-be-sent data block from the first storage module Block 903. Further, the first replication module 901 includes a first data movement engine (DME) 9011 and a first transceiver module NGW IoRouter 9012, where the DME includes a first link reduction module Dedup 90111.

A node 92 of the second device (target end) includes a second replication module 904 and a second interface module 905. The second replication module 904 is configured to perform data replication (which may be data synchronization or data backup) with the first device, and the second interface module 905 is configured to communicate with another node. A communications interface is disposed between the second replication module 904 and a second storage module Block 906, so that the second replication module 904 can read a data block from or write a data block into the second storage module Block 906. Further, the second replication module 904 includes a data movement engine (DME) 9041 and a second transceiver module NGW IoRouter 9042, where the DME includes a second link reduction module Dedup 90411.

Based on the architecture shown in FIG. 9, the following describes in detail data flows and specific data processing manners in the two solutions provided in this application.

1. An index is stored in a target end, and the target end searches for a similar block.

Figure 10:
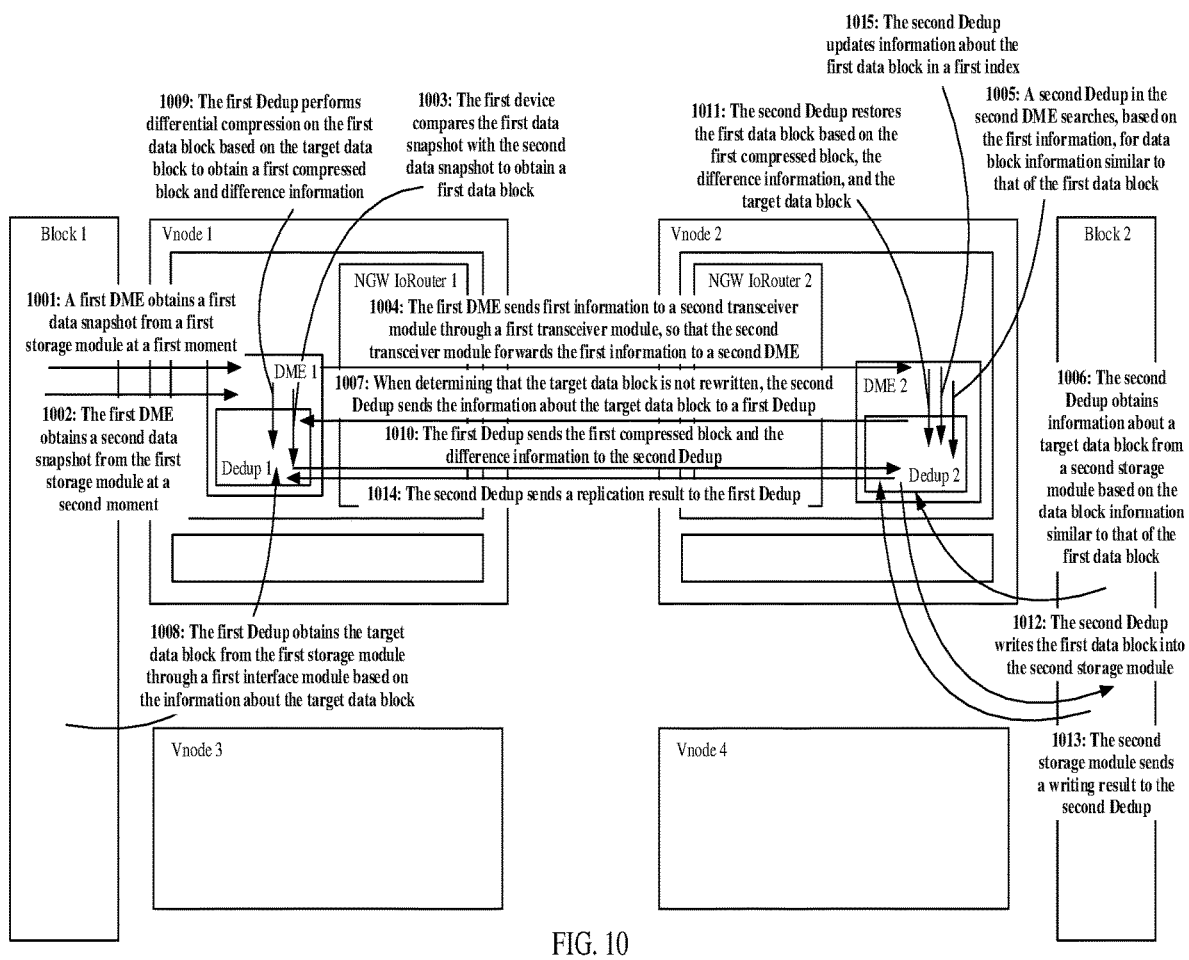
FIG. 10 is a schematic diagram of a data flow of an implementation of a data transmission method in a system apparatus according to an embodiment of this application.

As shown in FIG. 10, based on the system architecture shown in FIG. 9, a data processing mode in the architecture in the first case in embodiments of this application includes the following steps.

1001: A first DME obtains a first data snapshot from a first storage module at a first moment.

In this embodiment, the first data snapshot is used to record a data storage status in the first storage module at the first moment, and the first data snapshot may be identified as snapid1 in the DME.

1002: The first DME obtains a second data snapshot from the first storage module at a second moment.

In this embodiment, the second moment is a moment after the first moment, the second data snapshot is used to record a data storage status in the first storage module at the second moment, and the second data snapshot may be identified as snapid2 in the DME.

1003: The first device compares the first data snapshot with the second data snapshot to obtain a first data block.

In this embodiment, by comparing the first data snapshot with the second data snapshot, the first device knows a change of locally stored data in a time period from the first moment to the second moment. The changed data is data that needs to be sent to a second device for backup. Therefore, data that is in the second data snapshot and that is different from the first data snapshot is obtained as the first data block that needs to be sent to the second device.

Further, after obtaining the first data block, the first device obtains a similar fingerprint and a strong fingerprint of the first data block; and then the first device generates first information, where the first information includes the similar fingerprint and the strong fingerprint.

1004: The first DME sends the first information to a second transceiver module through a first transceiver module, so that the second transceiver module forwards the first information to a second DME.

In this embodiment, the first information is information about the first data block. For specific content in the first information, refer to Embodiment 1 to Embodiment 3. Details are not described herein again.

1005: A second Dedup in the second DME searches, based on the first information, for data block information similar to that of the first data block.

In this embodiment, the second Dedup searches a first index. For a specific implementation in which the second Dedup searches the first index for the data block information similar to that of the first data block, refer to Embodiment 1 to Embodiment 3. Details are not described herein again.

1006: The second Dedup obtains information about a target data block from a second storage module based on the data block information similar to that of the first data block.

In this embodiment, the data block information similar to that of the first data block is the information about the target data block. The information may include strong fingerprint information, storage address information, similar fingerprint information, and the like of the target data block. For a specific implementation, refer to Embodiment 1 to Embodiment 3. Details are not described herein again.

1007: When determining that the target data block is not rewritten, the second Dedup sends the information about the target data block to a first Dedup.

In this embodiment, there may be one or more target data blocks. For details, refer to records in Embodiment 1 to Embodiment 3. Details are not described herein again.

1008: The first Dedup obtains the target data block from the first storage module through a first interface module based on the information about the target data block.

In this embodiment, the first Dedup obtains the target data block from local storage, that is, the first storage module, based on a storage address recorded in the information about the target data block. If there are a plurality of target data blocks, the first Dedup further needs to select, from the target data blocks as a reference block, a data block that is not rewritten.

1009: The first Dedup performs differential compression on the first data block based on the target data block to obtain a first compressed block and difference information.

In this embodiment, for a specific differential compression manner, refer to records in Embodiment 1 to Embodiment 3. Details are not described herein again.

1010: The first Dedup sends the first compressed block and the difference information to the second Dedup.

In this embodiment, the first compressed block and the difference information reach the second DME through the first transceiver module and the second transceiver module sequentially, and are sent by the second DME to the second Dedup. Further, the first Dedup may send a storage address or identification information of the target data block in the second device. For details, refer to records in Embodiment 1 to Embodiment 3. Details are not described herein again.

1011: The second Dedup restores the first data block based on the first compressed block, the difference information, and the target data block.

In this embodiment, for a specific implementation in which the second Dedup restores the first data block based on the first compressed block, the difference information, and the target data block, refer to records in Embodiment 1 to Embodiment 3. Details are not described herein again.

1012: The second Dedup writes the first data block into the second storage module.

In this embodiment, the second Dedup writes the first data block into the second storage module through the second interface module, to write the latest obtained first data block into the local storage.

1013: The second storage module sends a writing result to the second Dedup.

In this embodiment, the second storage module sends the writing result to the second Dedup by using the second interface module, so that the second Dedup knows a writing status of the first data block.

1014: The second Dedup sends a replication result to the first Dedup.

In this embodiment, the second Dedup sends the replication result to the first Dedup, so that the first device knows whether the data block is successfully sent. If the data block is not successfully sent, the first device may further resend a complete compressed block of the first data block to the second device.

1015: The second Dedup updates information about the first data block in the first index.

In this embodiment, the first index may be in a same node of the second Dedup, or may be in another target node. The another target node is also a second device. Separate parts of the first index are separately stored in a plurality of second device nodes, to implement load balancing search of the first index. When the second Dedup needs to update the information about the first data block to a Dedup of another second device node, the second Dedup sends the information about the first data block to the Dedup, so that the Dedup updates the first index.

In this embodiment, the data transmission methods shown in Embodiment 1 to Embodiment 3 are implemented through cooperative work of the modules in the system architecture.

2. An index is stored in a source end, and the source end searches for a similar block.

Figure 11:
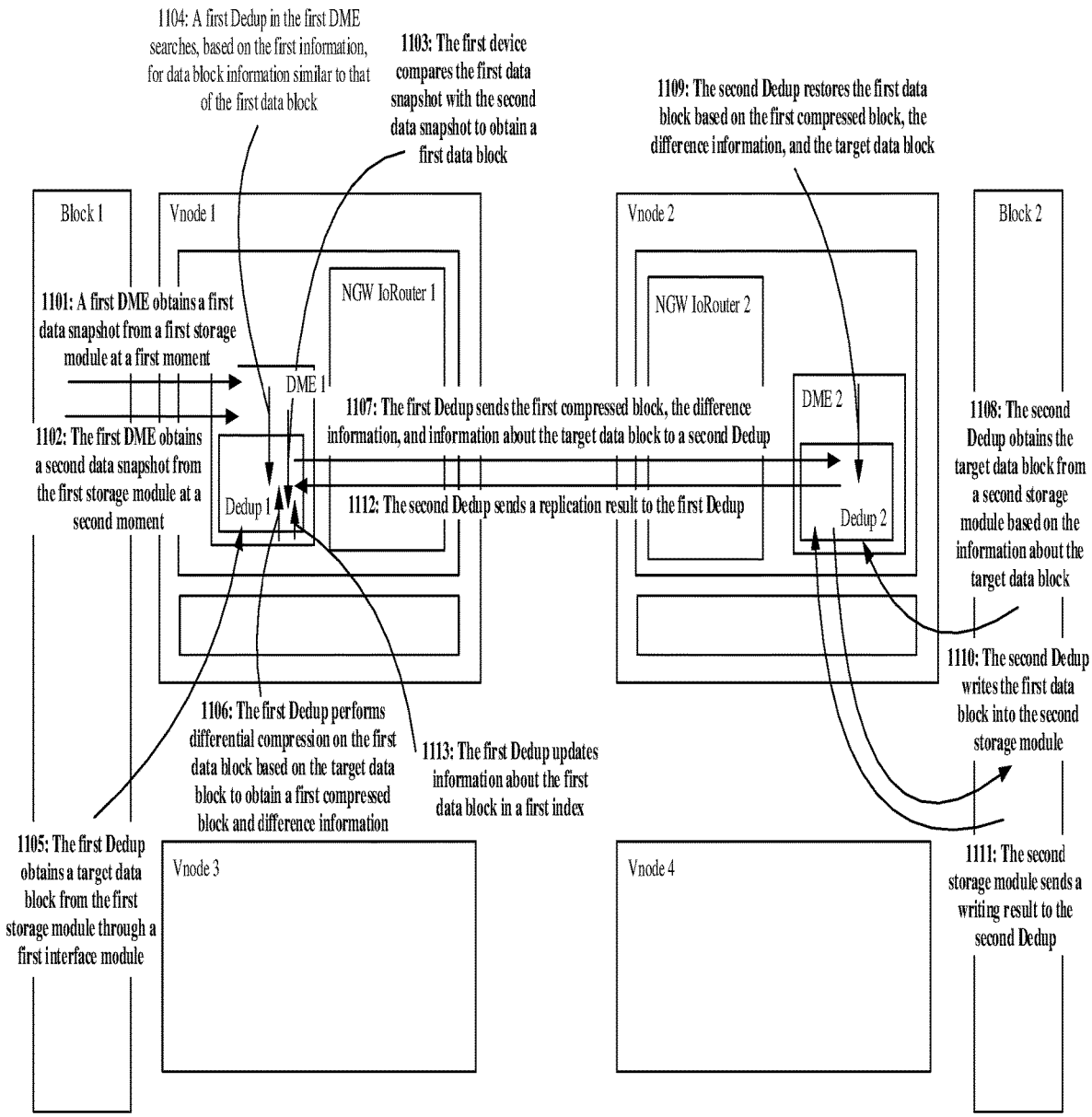
FIG. 11 is a schematic diagram of a data flow of another implementation of a data transmission method in a system apparatus according to an embodiment of this application.

As shown in FIG. 11, based on the system architecture shown in FIG. 9, a data processing mode in the architecture in the second case in embodiments of this application includes the following steps.

For steps 1101 to 1103, refer to the foregoing steps 1001 to 1003. Details are not described herein again.

1104: A first Dedup in the first DME searches, based on the first information, for data block information similar to that of the first data block.

In this embodiment, the first information is obtained by the first Dedup from the first data block, a first index is set in the first device, and the first Dedup searches the first index. For a specific implementation in which the first Dedup searches the first index for the data block information similar to that of the first data block, refer to Embodiment 4 or Embodiment 5. Details are not described herein again.

1105: The first Dedup obtains a target data block from the first storage module through a first interface module.

In this embodiment, the first Dedup finds, based on the first information, that a data block similar to the first data block is the target data block, where the information includes a storage address of the target data block in the first storage module. Therefore, the first Dedup may obtain the target data block based on the address. Further, the first Dedup may verify whether the target data block is rewritten. For details, refer to Embodiment 4 or Embodiment 5. Details are not described herein again.

1106: The first Dedup performs differential compression on the first data block based on the target data block to obtain a first compressed block and difference information.

In this embodiment, the target data block is a data block that is similar to the first data block and that is found by the first Dedup based on the first information. For a specific working manner in which the first Dedup performs differential compression on the first data block based on the target data block to obtain the first compressed block and the difference information, refer to Embodiment 4 or Embodiment 5. Details are not described herein again.

1107: The first Dedup sends the first compressed block, the difference information, and information about the target data block to a second Dedup.

In this embodiment, for a specific working manner in which the first Dedup sends the first compressed block, the difference information, and the information about the target data block to the second Dedup, refer to Embodiment 4 or Embodiment 5. Details are not described herein again.

1108: The second Dedup obtains the target data block from a second storage module based on the information about the target data block.

In this embodiment, the information about the target data block may be a storage address of the target data block in the second storage module, or may be identification information of the target data block. For a specific working manner, refer to Embodiment 4 or Embodiment 5. Details are not described herein again.

For steps 1109 to 1112, refer to the foregoing steps 1011 to 1014. Details are not described herein again.

1113: The first Dedup updates information about the first data block in the first index.

In this embodiment, based on the replication result sent by the second Dedup, the first Dedup may know that the first data block is successfully written in the second device. In this case, the first Dedup updates the information about the first data block in the first index.

In this embodiment, the data transmission methods shown in Embodiment 4 and Embodiment 5 are implemented through cooperative work of the modules in the system architecture.

A data transmission method provided in the embodiments includes: A first device sends first information of a first data block to a second device, where the first data block is a data block to be sent by the first device to the second device, and the first information is used to describe an attribute of the first data block; the second device searches, based on the first information, a first index for a second data block similar to the first data block, where the first index is used to record information about a data block that has been received by the second device from the first device; the second device sends second information of the second data block to the first device, where the second information is used to describe an attribute of the second data block; the first device locally obtains a reference block based on the second information, where the reference block is the same as the second data block; the first device compresses a difference part of the first data block relative to the reference block, to obtain first compressed information; the first device sends the first compressed information to the second device; and the second device obtains the first data block based on the first compressed information and the second data block. In this way, a similarity-based deduplication technology is implemented. For a to-be-sent data block, if a transmitted data block is similar to the to-be-sent data block, only a difference part between the two data blocks is transmitted. This effectively reduces data links and improves transmission efficiency of a data synchronization technology.

From a perspective of a hardware structure, the foregoing method may be implemented by one physical device, or may be jointly implemented by a plurality of physical devices, or may be implemented by one logical function module in one physical device. This is not specifically limited in embodiments of this application.

Figure 12:
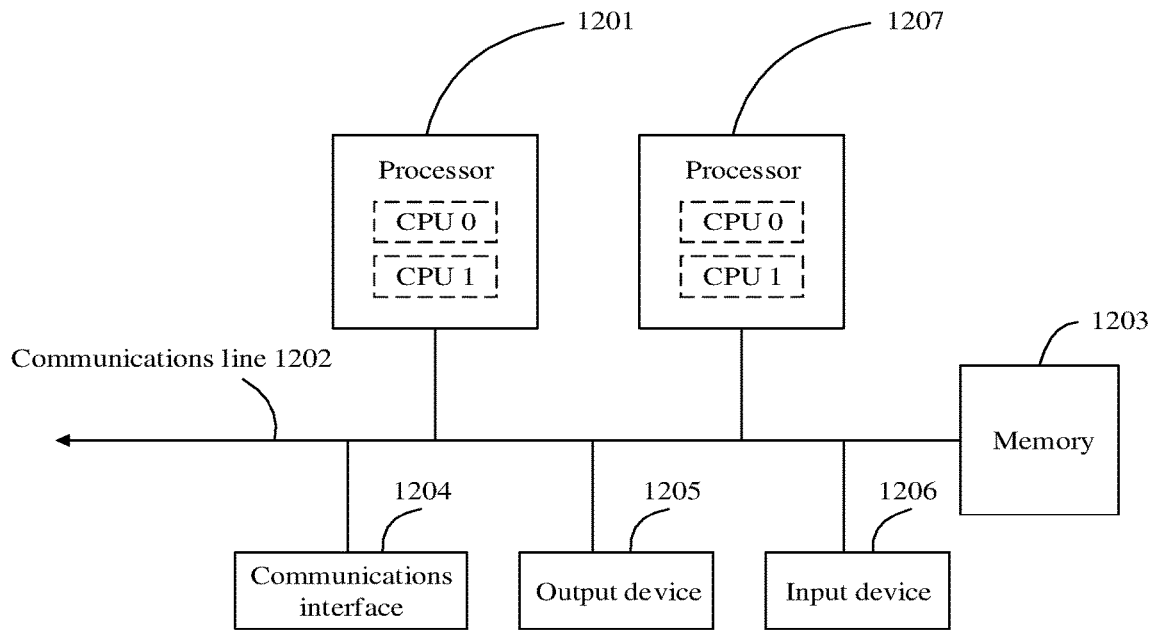
FIG. 12 is a schematic diagram of an electronic device according to an embodiment of this application.

For example, the foregoing method may be implemented by an electronic device in FIG. 12. FIG. 12 is a schematic diagram of a hardware structure of an electronic device according to an embodiment of this application. The electronic device may be the electronic device in embodiments of the present disclosure, or may be a terminal device. The electronic device includes at least one processor 1201, a communications line 1202, a memory 1203, and at least one communications interface 1204.

The processor 1201 may be a general-purpose central processing unit (CPU), a microprocessor, an application-specific integrated circuit (server IC), or one or more integrated circuits configured to control program execution of the solutions in this application.

The communications line 1202 may include a path for transmitting information between the foregoing components.

The communications interface 1204 is configured to communicate with another device or a communications network, such as an Ethernet, a radio access network (RAN), or a wireless local area network (WLAN), via any apparatus such as a transceiver.

The memory 1203 may be a read-only memory (ROM) or another type of static storage device capable of storing static information and instructions, or a random access memory (RAM) or another type of dynamic storage device capable of storing information and instructions, or may be an electrically erasable programmable read-only memory (EEPROM), a compact disc read-only memory (CD-ROM) or other compact disc storage, optical disc storage (including a compressed optical disc, a laser disc, an optical disc, a digital versatile optical disc, a blue-ray optical disc, or the like), a magnetic disk storage medium or another magnetic storage device, or any other medium capable of carrying or storing expected program code in a form of instructions or data structures and capable of being accessed by a computer, but is not limited thereto. The memory may exist independently and is connected to the processor through the communications line 1202. Alternatively, the memory may be integrated with the processor.

The memory 1203 is configured to store computer-executable instructions for executing the solutions of this application, and the processor 1201 controls the execution. The processor 1201 is configured to execute the computer-executable instructions stored in the memory 1203, to implement the data transmission method provided in the following embodiments of this application.

Optionally, the computer-executable instructions in this embodiment of this application may also be referred to as application program code. This is not specifically limited in this embodiment of this application.

During specific implementation, in an embodiment, the processor 1201 may include one or more CPUs, for example, a CPU 0 and a CPU 1 in FIG. 12.

During specific implementation, in an embodiment, the electronic device may include a plurality of processors, for example, the processor 1201 and a processor 1207 in FIG. 12. Each of the processors may be a single-core (single-CPU) processor, or may be a multi-core (multi-CPU) processor. The processor herein may be one or more devices, circuits, and/or processing cores configured to process data (for example, computer program instructions).

During specific implementation, in an embodiment, the electronic device may further include an output device 1205 and an input device 1206. The output device 1205 communicates with the processor 1201, and may display information in a plurality of manners. For example, the output device 1205 may be a liquid crystal display (LCD), a light-emitting diode (LED) display device, a cathode ray tube (CRT) display device, or a projector. The input device 1206 communicates with the processor 1201, and can receive input from a user in a plurality of manners. For example, the input device 1206 may be a mouse, a keyboard, a touchscreen device, or a sensing device.

The electronic device may be a general-purpose device or a dedicated device. During specific implementation, the electronic device may be a server, a wireless terminal device, an embedded device, or a device having a structure similar to that in FIG. 12. A type of the electronic device is not limited in this embodiment of this application.

In embodiments of this application, the electronic device may be divided into function units based on the foregoing method example. For example, each function unit may be obtained through division based on each corresponding function, or two or more functions may be integrated into one processing unit. The integrated unit may be implemented in a form of hardware, or may be implemented in a form of a software function unit. It should be noted that, in embodiments of this application, division into the units is an example, and is merely logical function division. In actual implementation, another division manner may be used.

Figure 13:
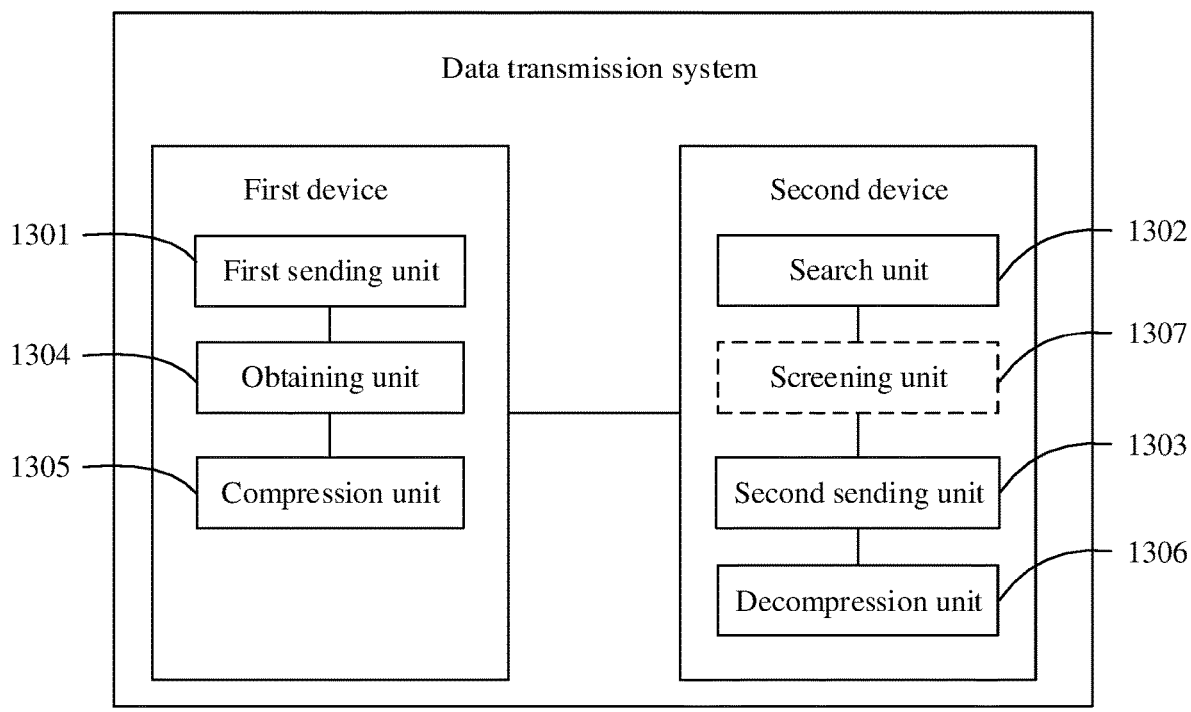
FIG. 13 is a schematic diagram of a data transmission system according to an embodiment of this application.

For example, when the function units are obtained through division in an integrated manner, FIG. 13 is a schematic diagram of a structure of a data transmission system according to an embodiment of this application.

As shown in FIG. 13, an embodiment of this application provides a data transmission system, including a first device and a second device. The second device is configured to receive data sent by the first device. The first device includes:

a first sending unit 1301, where the first sending unit 1301 is configured to send first information of a first data block to the second device, the first data block is a data block to be sent by the first device to the second device, and the first information is used to describe an attribute of the first data block.

The second device includes:

a search unit 1302, where the search unit 1302 is configured to search, based on the first information sent by the sending unit, a first index for a second data block similar to the first data block, and the first index is used to record information about a data block that has been received by the second device from the first device; and a second sending unit 1303, where the second sending unit 1303 is configured to send second information of the second data block found by the search unit 1302 to the first device, and the second information is used to describe an attribute of the second data block.

The first device further includes:

an obtaining unit 1304, where the obtaining unit 1304 is configured to locally obtain a reference block based on the second information, and the reference block is the same as the second data block; and a compression unit 1305, where the compression unit 1305 is configured to compress a difference part of the first data block relative to the reference block obtained by the obtaining unit 1304, to obtain first compressed information.

The first sending unit 1301 is further configured to send the first compressed information to the second device.

The second device further includes:

a decompression unit 1306, where the decompression unit 1306 is configured to obtain the first data block based on the first compressed information and the second data block.

Optionally, the first information includes a first similar fingerprint, the first similar fingerprint is a weak hash value of the first data block, a first correspondence between a similar fingerprint of a data block and a second address of the data block in the second device is recorded in the first index, and the search unit 1302 is further configured to:

search the first index for a second similar fingerprint that is the same as the first similar fingerprint, where the second similar fingerprint is a similar fingerprint of the second data block;

obtain a second address from the first correspondence based on the second similar fingerprint, where the second address is a second address of the second data block in the second device; and obtain the second data block based on the second address.

Optionally, the second information further includes a storage address of the reference block in the first device, and the obtaining unit 1304 is further configured to:

locally obtain the reference block based on the storage address of the reference block in the first device.

Optionally, the first correspondence includes a correspondence between a second address and each of a strong fingerprint and a similar fingerprint, the strong fingerprint is a strong hash value of a data block, and the strong hash value is used to describe a data attribute of the corresponding data block; and when the second device finds, in the first index, M target similar fingerprints that are the same as the first similar fingerprint, where M is a positive integer greater than 1, the second device further includes a screening unit 1307, and the screening unit 1307 is configured to:

obtain M target addresses corresponding to the M target similar fingerprints from the first correspondence based on the M target similar fingerprints;

obtain M target data blocks based on the M target addresses;

obtain strong fingerprints of the M target data blocks; and obtain one target data block from the M target data blocks as the second data block, where a strong fingerprint of the second data block is consistent with a strong fingerprint recorded in the first index.

Optionally, when the second device obtains, from the M target data blocks, N data blocks similar to the first data block, the second information includes strong fingerprints and mark information of the N candidate data blocks and first addresses of the N candidate data blocks in the first device, where the N candidate data blocks are separately similar to the first data block, the strong fingerprints of the N candidate data blocks are strong hash values of the N candidate data blocks, and N is a positive integer greater than 1; and the obtaining unit 1304 is further configured to:

obtain the N candidate data blocks from local storage based on the first addresses of the N candidate data blocks in the first device;

obtain the strong fingerprints of the N candidate data blocks; and obtain one target candidate data block from the N candidate data blocks as the reference block, where a strong fingerprint of the target candidate data block is the same as a strong fingerprint recorded in the second information.

The first sending unit 1301 is further configured to:
send mark information of the target candidate data block to the second device.

The decompression unit 1306 is further configured to:
locally obtain the target candidate block based on the mark information of the target candidate data block; and
obtain the first data block based on the first compressed information and the target candidate data block.

Optionally, the first compressed information includes a first compressed block and difference information, the first compressed block includes the difference part between the first data block and the reference block, the difference information is used to describe a status of a difference between the first data block and the reference block, and the decompression unit 1306 is further configured to:
obtain the first data block based on the first compressed block, the difference information, and the second data block.

Figure 14:
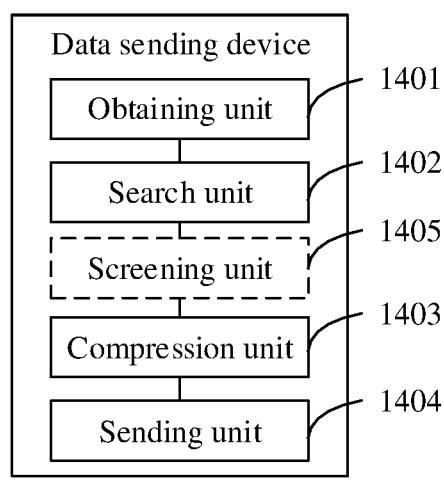
FIG. 14 is a schematic diagram of a data sending device according to an embodiment of this application.

Further, as shown in FIG. 14, an embodiment of this application provides a data sending device, including:
an obtaining unit 1401, where the obtaining unit 1401 is configured to obtain first information of a first data block, the first data block is a data block to be sent by the data sending device to a second device, the second device is configured to receive a data block sent by the data sending device, and the first information is used to describe an attribute of the first data block;
a search unit 1402, where the search unit 1402 is configured to search, based on the first information obtained by the obtaining unit 1401, a first index for a second data block similar to the first data block, and the first index is used to record information about a data block that has been sent by the data sending device to the second device;
a compression unit 1403, where the compression unit 1403 is configured to compress a difference part of the first data block relative to the second data block found by the search unit 1402, to obtain first compressed information; and
a sending unit 1404, where the sending unit 1404 is configured to send the first compressed information obtained by the compression unit 1403 to the second device, so that the second device obtains the first data block based on the first compressed information.

Optionally, the first information includes a first similar fingerprint, the first similar fingerprint is a weak hash value of the first data block, a first correspondence between a similar fingerprint of a data block and a storage address of the data block in the first device is recorded in the first index, and the search unit 1402 is further configured to:
search the first index for a second similar fingerprint that is the same as the first similar fingerprint, where the second similar fingerprint is a weak hash value of the second data block;
obtain a second address from the first correspondence based on the second similar fingerprint, where the second address is a storage address of the second data block in the first device; and
obtain the second data block based on the second address.

Optionally, the first correspondence is a correspondence between a storage address and each of a strong fingerprint and a similar fingerprint, the strong fingerprint is a strong hash value of a data block, and the strong hash value is used to describe a data attribute of the corresponding data block; and when the first device finds, in the first index, M target similar fingerprints that are the same as the first similar fingerprint, where M is a positive integer greater than 1, the device further includes a screening unit 1405, and the screening unit 1405 is configured to:

obtain M target addresses corresponding to the M target similar fingerprints from the first correspondence based on the M target similar fingerprints;
obtain M target data blocks based on the M target addresses;
obtain strong fingerprints of the M target data blocks; and
obtain one target data block from the M target data blocks as the second data block, where a strong fingerprint of the second data block is consistent with a strong fingerprint recorded in the first index.

Optionally, the first compressed information includes a first compressed block and difference information, the first compressed block includes the difference part between the first data block and the second data block, and the difference information is used to describe a status of a difference between the first data block and the second data block, so that the second device obtains the first data block based on the first compressed block, the difference information, and a reference block, where the reference block is a data block that is in the second device and that is the same as the second data block.

Figure 15:
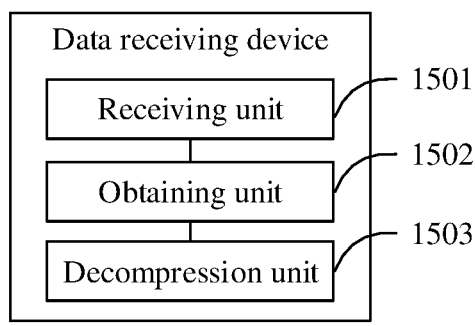
FIG. 15 is a schematic diagram of a data receiving device according to an embodiment of this application.

Further, as shown in FIG. 15, an embodiment of this application provides a data receiving device, including:
a receiving unit 1501, where the receiving unit 1501 is configured to obtain first compressed information from a first device, the first compressed information is information obtained by the first device by compressing a difference part of a first data block relative to a second data block, the first data block is a data block to be sent by the first device to the data receiving device, and the second data block is a data block that has been sent by the first device to the data receiving device;
an obtaining unit 1502, where the obtaining unit 1502 is configured to locally obtain a reference block based on the first compressed information, and the reference block is the same as the second data block in the first device; and
a decompression unit 1503, where the decompression unit 1503 is configured to obtain the first data block based on the first compressed information received by the receiving unit 1501 and the reference block obtained by the obtaining unit 1502.

Optionally, the first compressed information includes a first compressed block and difference information, the first compressed block includes the difference part between the first data block and the second data block, the difference information is used to describe a status of a difference between the first data block and the second data block, and the decompression unit 1503 is further configured to:
obtain the first data block based on the first compressed block, the difference information, and the reference block.

Optionally, the first compressed information includes a storage address of the reference block in the second device, and the obtaining unit 1502 is further configured to:
locally obtain the reference block based on the storage address of the reference block in the second device.

All or some of the foregoing embodiments may be implemented by using software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, the procedures or functions according to embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk Solid State Disk (SSD)), or the like.

It may be clearly understood by a person skilled in the art that, for the purpose of convenient and brief description, for a detailed working process of the foregoing system, apparatus, and unit, refer to a corresponding process in the method embodiments. Details are not described herein again.

In the several embodiments provided in this application, it should be understood that the disclosed communication method, relay device, donor base station, and computer storage medium may be implemented in other manners. For example, the described apparatus embodiments are merely examples. For example, division into the units is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, function units in embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (English full name: Read-Only Memory, ROM for short), a random access memory (English full name: Random Access Memory, RAM for short), a magnetic disk, or an optical disc.

In conclusion, the foregoing embodiments are merely intended to describe the technical solutions of this application, but not to limit this application. Although this application is described in detail with reference to the foregoing embodiments, persons of ordinary skill in the art should understand that they may still make modifications to the technical solutions recorded in the foregoing embodiments or make equivalent replacements to some technical features thereof, without departing from the spirit and scope of the technical solutions of embodiments of this application.

What is claimed is:

1. A data transmission method, comprising:
   sending, by a first device, first information of a first data block to a second device, wherein the first data block is a data block to be sent by the first device to the second device, and the first information is used to describe an attribute of the first data block;
   searching, by the second device based on the first information, a first index for a second data block similar to the first data block, wherein the first index is used to record, by the second device, information about a data block that has been received by the second device from the first device, and the first index includes a correspondence between a storage address and each of a strong fingerprint and a similar fingerprint that are of the received data block;
   sending, by the second device, second information of the second data block to the first device, wherein the second data block was previously sent from the first device and received by the second device, and the second information is used to describe an attribute of the second data block;
   locally obtaining, by the first device, a reference block based on the second information, wherein the reference block is the same as the second data block;
   compressing, by the first device, a difference part of the first data block relative to the reference block to obtain first compressed information;
   sending, by the first device, the first compressed information to the second device; and
   obtaining, by the second device, the first data block based on the first compressed information and the second data block.

2. The method according to claim 1, wherein the first information comprises a first similar fingerprint, the first similar fingerprint is a weak hash value of the first data block, a first correspondence between a similar fingerprint of a data block and a second address of the data block in the second device is recorded in the first index, and the searching, by the second device based on the first information, a first index for a second data block similar to the first data block comprises:
   searching, by the second device, the first index for a second similar fingerprint that is the same as the first similar fingerprint, wherein the second similar fingerprint is a similar fingerprint of the second data block;
   obtaining, by the second device, a second address from the first correspondence based on the second similar fingerprint, wherein the second address is a second address of the second data block in the second device; and
   obtaining, by the second device, the second data block based on the second address.

3. The method according to claim 2, wherein the first correspondence comprises a correspondence between a second address and each of a strong fingerprint and a similar fingerprint, the strong fingerprint is a strong hash value of a data block, and the strong hash value is used to describe a data attribute of the corresponding data block; and when the second device finds, in the first index, M target similar fingerprints that are the same as the first similar fingerprint, wherein M is a positive integer greater than 1, the method further comprises:
- obtaining, by the second device, M target addresses corresponding to the M target similar fingerprints from the first correspondence based on the M target similar fingerprints;
- obtaining, by the second device, M target data blocks based on the M target addresses;
- obtaining, by the second device, strong fingerprints of the M target data blocks; and
- obtaining, by the second device, one target data block from the M target data blocks as the second data block, wherein a strong fingerprint of the second data block is consistent with a strong fingerprint recorded in the first index.

4. The method according to claim 3, wherein when the second device obtains, from the M target data blocks, N candidate data blocks similar to the first data block, the second information comprises strong fingerprints and mark information of the N candidate data blocks and first addresses of the N candidate data blocks in the first device, wherein the N candidate data blocks are separately similar to the first data block, the strong fingerprints of the N candidate data blocks are strong hash values of the N candidate data blocks, and N is a positive integer greater than 1; and the locally obtaining, by the first device, a reference block based on the second information comprises:
- obtaining, by the first device, the N candidate data blocks from local storage based on the first addresses of the N candidate data blocks in the first device;
- obtaining, by the first device, the strong fingerprints of the N candidate data blocks; and
- obtaining, by the first device, one target candidate data block from the N candidate data blocks as the reference block, wherein a strong fingerprint of the target candidate data block is the same as a strong fingerprint recorded in the second information;
- wherein the sending, by the first device, the first compressed information to the second device comprises:
- sending, by the first device, mark information of the target candidate data block to the second device; and
- wherein the obtaining, by the second device, the first data block based on the first compressed information and the second data block comprises:
- locally obtaining, by the second device, the target candidate block based on the mark information of the target candidate data block; and
- obtaining, by the second device, the first data block based on the first compressed information and the target candidate data block.

5. The method according to claim 1, wherein the second information further comprises a storage address of the reference block in the first device, and the locally obtaining, by the first device, a reference block based on the second information comprises:
- locally obtaining, by the first device, the reference block based on the storage address of the reference block in the first device.

6. The method according to claim 1, wherein the first compressed information comprises a first compressed block and difference information, the first compressed block comprises the difference part between the first data block and the reference block, the difference information is used to describe a status of a difference between the first data block and the reference block, and the obtaining, by the second device, the first data block based on the first compressed information and the second data block comprises:
- obtaining, by the second device, the first data block based on the first compressed block, the difference information, and the second data block.

7. A data transmission method, comprising:
- obtaining, by a first device, first information of a first data block, wherein the first data block is a data block to be sent by the first device to a second device, the first information comprises a first address, a first strong fingerprint, and a first similar fingerprint of the first data block, and the first information is used to describe an attribute of the first data block;
- searching, by the first device based on the first information, a first index for a second data block similar to the first data block, wherein the first data block has a difference part relative to the second data block, and wherein the first index is used to record information about a data block that has been sent by the first device to the second device, and the first index includes a correspondence between a storage address and each of a strong fingerprint and a similar fingerprint of the data block that has been sent by the first device to the second device;
- compressing, by the first device, the difference part of the first data block relative to the second data block to obtain first compressed information; and
- sending, by the first device, the first compressed information to the second device.

8. The method according to claim 7, wherein the first similar fingerprint is a weak hash value of the first data block, a first correspondence between a similar fingerprint of a data block and a storage address of the data block in the first device is recorded in the first index, and the searching, by the first device based on the first information, a first index for a second data block similar to the first data block comprises:
- searching, by the first device, the first index for a second similar fingerprint that is the same as the first similar fingerprint, wherein the second similar fingerprint is a weak hash value of the second data block;
- obtaining, by the first device, a second address from the first correspondence based on the second similar fingerprint, wherein the second address is a storage address of the second data block in the first device; and
- obtaining, by the first device, the second data block based on the second address.

9. The method according to claim 8, wherein the first correspondence is a correspondence between a storage address and each of a strong fingerprint and a similar fingerprint, the strong fingerprint is a strong hash value of a data block, and the strong hash value is used to describe a data attribute of the corresponding data block; and when the first device finds, in the first index, M target similar fingerprints that are the same as the first similar fingerprint, wherein M is a positive integer greater than 1, the method further comprises:

obtaining, by the first device, M target addresses corresponding to the M target similar fingerprints from the first correspondence based on the M target similar fingerprints;

obtaining, by the first device, M target data blocks based on the M target addresses;

obtaining, by the first device, strong fingerprints of the M target data blocks; and obtaining, by the first device, one target data block from the M target data blocks as the second data block, wherein a strong fingerprint of the second data block is consistent with a strong fingerprint recorded in the first index.

10. The method according to claim 7, wherein the first compressed information comprises a first compressed block and difference information, the first compressed block comprises the difference part between the first data block and the second data block, and the difference information is used to describe a status of a difference between the first data block and the second data block.

11. The method according to claim 1, wherein the first index is stored in an external storage device connected to the second device.

12. An electronic device, wherein the electronic device comprises an interaction apparatus, an input/output (I/O) interface, at least one processor, and a memory, and the memory stores program instructions;

the interaction apparatus is configured to obtain an operation instruction entered by a user; and the program instructions are for execution by the at least one processor to perform operations comprising:

sending first information of a first data block to a second device, wherein the first data block is a data block to be sent by the electronic device to the second device, and the first information is used to describe an attribute of the first data block;

receiving second information of a second data block from the second device, wherein the second data block was previously sent by the electronic device to the second device, and is searched from a first index used to record information about a data block that has been received by the second device from the electronic device, the first index includes correspondence between a storage address and each of a strong fingerprint and a similar fingerprint that are of the received data block, and the second information is used to describe an attribute of the second data block;

locally obtaining a reference block based on the second information, wherein the reference block is the same as the second data block;

compressing a difference part of the first data block relative to the reference block to obtain first compressed information; and sending the first compressed information to the second device.

13. An electronic device, wherein the electronic device comprises an interaction apparatus, an input/output (I/O) interface, at least one processor, and a memory, and the memory stores program instructions;

the interaction apparatus is configured to obtain an operation instruction entered by a user, and the program instructions are for execution by the at least one processor to perform operations comprising:

obtaining first information of a first data block, wherein the first data block is a data block to be sent by the electronic device to a second device, the first information comprises a first address, a first strong fingerprint, and a first similar fingerprint of the first data block, and the first information is used to describe an attribute of the first data block;

searching, based on the first information, a first index for a second data block similar to the first data block, wherein the first data block has a difference part relative to the second data block, and wherein the first index is used to record information about a data block that has been sent by the electronic device to the second device, and the first index includes a correspondence between a storage address and each of a strong fingerprint and a similar fingerprint of the data block that has been sent by the electronic device to the second device;

compressing the difference part of the first data block relative to the second data block to obtain first compressed information; and sending the first compressed information to the second device.

14. The electronic device according to claim 13, wherein the first similar fingerprint is a weak hash value of the first data block, a first correspondence between a similar fingerprint of a data block and a storage address of the data block in the electronic device is recorded in the first index, and the searching a first index for a second data block similar to the first data block comprises:

searching the first index for a second similar fingerprint that is the same as the first similar fingerprint, wherein the second similar fingerprint is a weak hash value of the second data block;

obtaining a second address from the first correspondence based on the second similar fingerprint, wherein the second address is a storage address of the second data block in the electronic device; and obtaining the second data block based on the second address.

15. The electronic device according to claim 14, wherein the first correspondence is a correspondence between a storage address and each of a strong fingerprint and a similar fingerprint, the strong fingerprint is a strong hash value of a data block, and the strong hash value is used to describe a data attribute of the corresponding data block; and when the electronic device finds, in the first index, M target similar fingerprints that are the same as the first similar fingerprint, wherein M is a positive integer greater than 1, the operations further comprise:

obtaining M target addresses corresponding to the M target similar fingerprints from the first correspondence based on the M target similar fingerprints;

obtaining M target data blocks based on the M target addresses;

obtaining strong fingerprints of the M target data blocks; and obtaining one target data block from the M target data blocks as the second data block, wherein a strong fingerprint of the second data block is consistent with a strong fingerprint recorded in the first index.

16. The electronic device according to claim 13, wherein the first compressed information comprises a first compressed block and difference information, the first compressed block comprises the difference part between the first data block and the second data block, and the difference information is used to describe a status of a difference between the first data block and the second data block.

17. The electronic device according to claim 12, wherein the first information comprises a first similar fingerprint, the first similar fingerprint is a weak hash value of the first data block, and a first correspondence between a similar fingerprint of a data block and a second address of the data block in the second device is recorded in a first index.

18. The electronic device according to claim 17, wherein the first correspondence comprises a correspondence between a second address and each of a strong fingerprint and a similar fingerprint, the strong fingerprint is a strong hash value of a data block, and the strong hash value is used to describe a data attribute of the corresponding data block.

19. The electronic device according to claim 18, wherein the locally obtaining a reference block based on the second information comprises:
obtaining N candidate data blocks from local storage based on first addresses of the N candidate data blocks in the electronic device, wherein N is a positive integer greater than 1;
obtaining strong fingerprints of the N candidate data blocks; and
obtaining one target candidate data block from the N candidate data blocks as the reference block, wherein a strong fingerprint of the target candidate data block is the same as a strong fingerprint recorded in the second information; and
wherein the sending the first compressed information to the second device comprises:
sending mark information of the target candidate data block to the second device.

20. The electronic device according to claim 12, wherein the second information further comprises a storage address of the reference block in the electronic device, and the locally obtaining a reference block based on the second information comprises:
locally obtaining the reference block based on the storage address of the reference block in the electronic device.

* * * * *